(12) United States Patent
Meki

(10) Patent No.: US 8,325,597 B2
(45) Date of Patent: Dec. 4, 2012

(54) BRIDGE APPARATUS AND VIRTUAL NETWORK SWITCHING METHOD

(75) Inventor: Seiji Meki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 348 days.

(21) Appl. No.: 12/639,979

(22) Filed: Dec. 16, 2009

(65) Prior Publication Data

US 2010/0158025 A1 Jun. 24, 2010

(30) Foreign Application Priority Data

Dec. 19, 2008 (JP) ................................. 2008-324448

(51) Int. Cl.
*H04L 1/00* (2006.01)
(52) U.S. Cl. .................... 370/222; 370/395.53
(58) Field of Classification Search .................. 370/216, 370/395, 469
See application file for complete search history.

(56) References Cited

U.S. PATENT DOCUMENTS

| | | | |
|---|---|---|---|
| 6,775,290 B1 * | 8/2004 | Merchant et al. | ........ 370/395.53 |
| 2007/0147231 A1 | 6/2007 | Yoshida et al. | |
| 2007/0263660 A1 | 11/2007 | Mitsumori | |
| 2010/0039934 A1 * | 2/2010 | McGuire et al. | .............. 370/225 |

FOREIGN PATENT DOCUMENTS

| | | |
|---|---|---|
| JP | 2007-181010 A | 7/2007 |
| JP | 2007-306344 A | 11/2007 |

* cited by examiner

*Primary Examiner* — Jianye Wu
*Assistant Examiner* — Wanda Z Russell
(74) *Attorney, Agent, or Firm* — Fujitsu Patent Center

(57) ABSTRACT

A bridge apparatus creates, transmits and circulates pass checking frames having virtual network identifiers in a ring network, and collects a passing/non-passing state of each virtual network identifier. The bridge apparatus creates, transmits and circulates a usage state checking frame in the ring network, and collects a used/unused state of the virtual network identifier of each bridge apparatus. The bridge apparatus creates, transmits and circulates a connection changing frame to change the virtual network identifier having the used state and the non-passing state into the virtual network identifier having the unused state and the passing state. Each bridge apparatus changes the virtual network identifier having the used state and the non-passing state into the virtual network identifier having the unused state and the passing state.

9 Claims, 26 Drawing Sheets

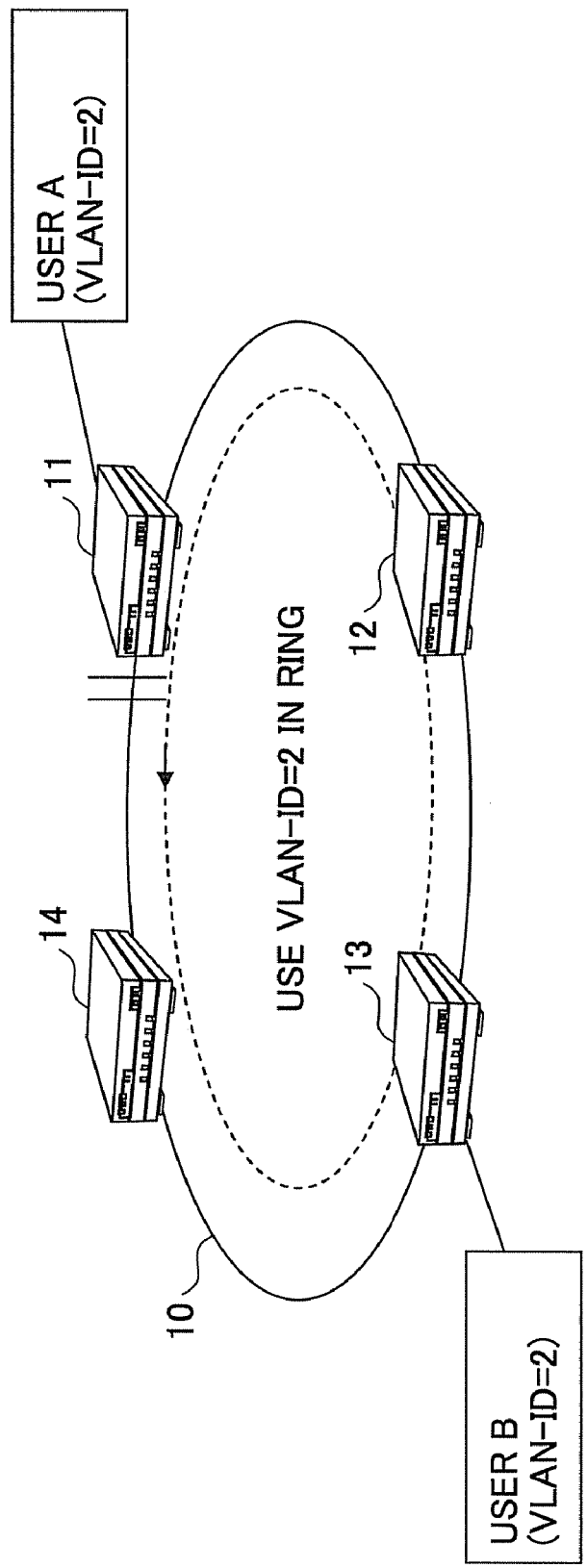

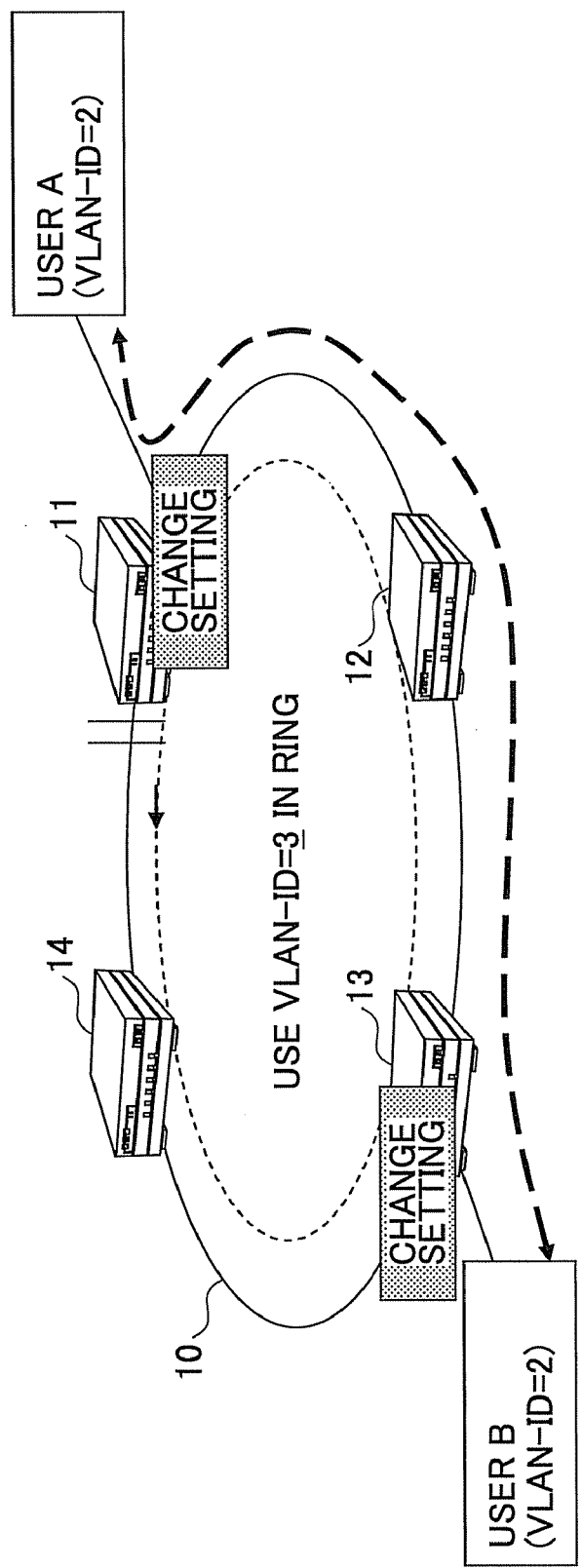

FIG.4

| FIELD | LENGTH (BYTES) | CONTENTS |
|---|---|---|
| DA | 6 | DESTINATION ADDRESS |
| SA | 6 | TRANSMISSION SOURCE ADDRESS |
| VLAN TAG | 4 | TYPE VALUE (0xFFF0) AND TAG CONTROL INFORMATION (2 BYTES) TAG CONTROL INFORMATION INCLUDES VLAN-ID (10 BITS) |
| TYPE | 2 | TYPE VALUE |
| DATA PART | 42 THROUGH 1500 | ANY |
| FCS | 4 | FRAME ERROR CHECK |

FIG.5

| FIELD | LENGTH (BYTES) | CONTENTS |
|---|---|---|
| DA | 6 | DESTINATION ADDRESS |
| SA | 6 | TRANSMISSION SOURCE ADDRESS |
| VLAN TAG | 4 | TYPE VALUE (0xFFF0) AND TAG CONTROL INFORMATION (2 BYTES) TAG CONTROL INFORMATION INCLUDES VLAN-ID (10 BITS) |
| TYPE | 2 | TYPE VALUE |
| DATA PART | 500 | BIT SEQUENCE OF 4094 BITS ORDER IS, VLAN-ID: 1, 2, 3 USED: "1", UNUSED: "0" |
| FCS | 4 | FRAME ERROR CHECK |

FIG.6

| FIELD | LENGTH (BYTES) | CONTENTS |
|---|---|---|
| DA | 6 | DESTINATION ADDRESS |
| SA | 6 | TRANSMISSION SOURCE ADDRESS |
| VLAN TAG | 4 | TYPE VALUE (0xFFF0) AND TAG CONTROL INFORMATION (2 BYTES) TAG CONTROL INFORMATION INCLUDES VLAN-ID (10 BITS) |
| TYPE | 2 | TYPE VALUE |
| DATA PART | 42 THROUGH 1500 | FIRST 2 BYTES: ORIGINAL VLAN-ID NEXT 2 BYTES: CHANGED VLAN-ID |
| FCS | 4 | FRAME ERROR CHECK |

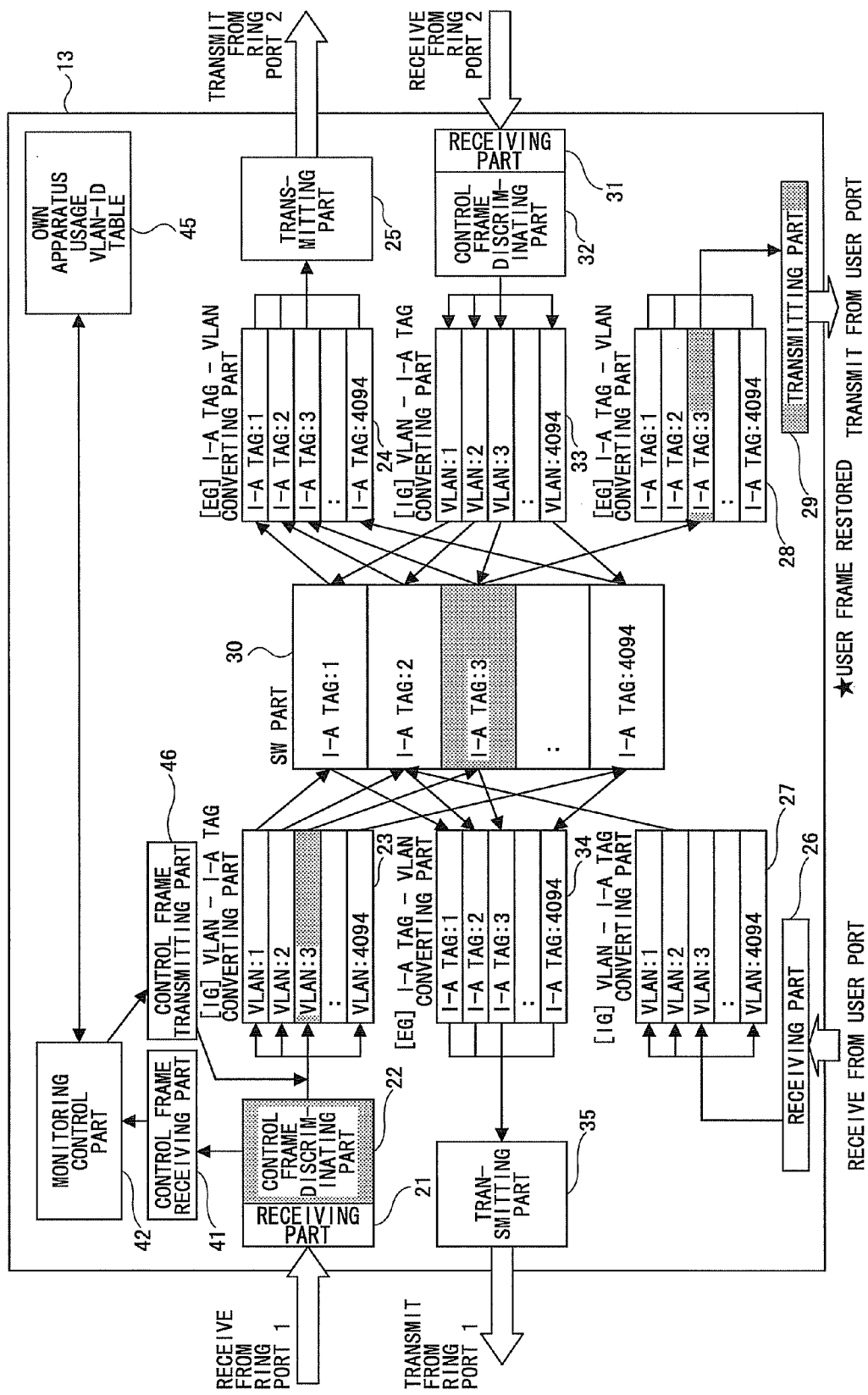

BRIDGE APPARATUS AND VIRTUAL NETWORK SWITCHING METHOD

CROSS-REFERENCE TO RELATED APPLICATIONS

This application is based upon and claims the benefit of priority of the prior Japanese Patent Application No. 2008-324448, filed on Dec. 19, 2008, the entire contents of which are incorporated herein by reference.

FIELD

The embodiment discussed herein is directed to a bridge apparatus and a virtual network switching method.

BACKGROUND

Japanese Laid-Open Patent Publication No. 2007-181010 discusses a path protection method. According to the path protection method, in a section connected in a point-to-point manner in a virtual network, a virtual network identifier assigned to one or more users is associated with one management virtual network identifier, is identified as one path, and a working path and a standby path are set with the use of paths each of which is identified as one path as mentioned above. When switching is performed between the working path and the standby path, service class information included in the management virtual network identifier is used in a manner such that a path having a management virtual network identifier having higher service class undergoes the switching with priority given.

SUMMARY

According to the embodiment, a bridge apparatus among plural bridge apparatuses included in a ring network, includes a pass checking frame creating and transmitting part configured to create plural pass checking frames that have plural virtual network identifiers that are different thereamong, respectively, to transmit the plural pass checking frames to the ring network and to cause the plural pass checking frames to go round the ring network; a virtual network identifier passing state collecting part configured to receive, from the ring network, the plural pass checking frames to collect a passing state or a non-passing state of each of the plural virtual network identifiers; a usage state checking frame creating and transmitting part configured to create a usage state checking frame, to transmit the usage state checking frame to the ring network and to cause the usage state checking frames to go round the ring network; a virtual network identifier usage state collecting part configured to receive the usage state checking frame from the ring network to collect a used state or an unused state of a virtual network identifier of each of the plural bridge apparatuses included in the ring network; a connection changing frame crating and transmitting part configured to create a connection changing frame which is used to change a virtual network identifier having a used state and a non-passing state into a virtual network identifier having an unused state and a passing state and transmit the virtual network identifier in the ring network, to transmit the connection changing frame, and to cause the connection changing frame to go around the ring network; and a virtual network identifier changing part configured to change, when a user port of the bridge apparatus indexes a virtual network identifier that has a used state and a non-passing state included in a connection changing frame that is received from the ring network, the virtual network identifier into a virtual network identifier having an unused state and a passing state.

According to another aspect of the embodiment, a virtual network switching method for a ring network includes a bridge apparatus among plural bridge apparatuses included in the ring network creating plural pass checking frames that have plural virtual network identifiers that are different thereamong, respectively, transmitting the plural pass checking frames to the ring network, causing the plural pass checking frames to go round the ring network, and collecting a passing state or a non-passing state of each of the plural virtual network identifiers; the bridge apparatus creating a usage state checking frame, transmitting the usage state checking frame to the ring network, causing the usage state checking frames to go round the ring network, and collecting a used state or an unused state of a virtual network identifier of each of the plural bridge apparatuses included in the ring network; the bridge apparatus creating a connection changing frame which is used to change a virtual network identifier having a used state and a non-passing state into a virtual network identifier having an unused state and a passing state and transmit the virtual network identifier in the ring network, transmitting the connection changing frame, causing the connection changing frame to go around the ring network; and each of the plural bridge apparatuses included in the ring network changing a virtual network identifier having a used state and a non-passing state into a virtual network identifier having an unused state and a passing state.

The object and advantages of the disclosure will be realized and attained by means of the elements and combinations particularly pointed out in the claims.

It is to be understood that both the foregoing general description and the following detailed description are exemplary and explanatory only and are not restrictive of the invention as claimed.

BRIEF DESCRIPTION OF DRAWINGS

FIGS. 3A, 3B and 3C illustrate operation of a ring network in the embodiment of the present invention;

FIG. 4 depicts a frame format of a pass checking frame in the embodiment of the present invention;

FIG. 5 depicts a frame format of a usage state checking frame in the embodiment of the present invention;

FIG. 6 depicts a frame format of a VLAN connection changing frame in the embodiment of the present invention;

FIGS. 16, 17, 18, 19, 20, 21, 22, 23 and 24 diagrammatically depict states of bridge apparatuses.

DESCRIPTION OF EMBODIMENT

In a LAN (Local Area Network) such as an Ethernet (registered trade name), a ring network may be used in which bridge apparatuses are connected in a ring manner. In such a ring network, a physical redundant route can be provided between any bridges, and thus, reliability can be improved.

It is noted that, in the specification, a WAN (Wide Area Network) and a MAN (Metropolitan Area Network) are included in LAN.

In LAN having a ring network, a data frame may circulate eternally in the ring network and proper communication may not be achieved. In order to solve the problem, a STP (Spanning Tree Protocol), a ring protocol or such may be used. According to a STP, a control packet called BPDU (Bridge Protocol Data Unit) is transmitted and received between bridge apparatuses based on a given priority, and thus, a logical route tree is provided.

According to the STP, in generating the route tree, a port of a bridge apparatus on a route which is not selected is logically blocked. Thereby, it is possible to uniquely determine a relay route for data frames between any bridge apparatuses.

Figure 1:
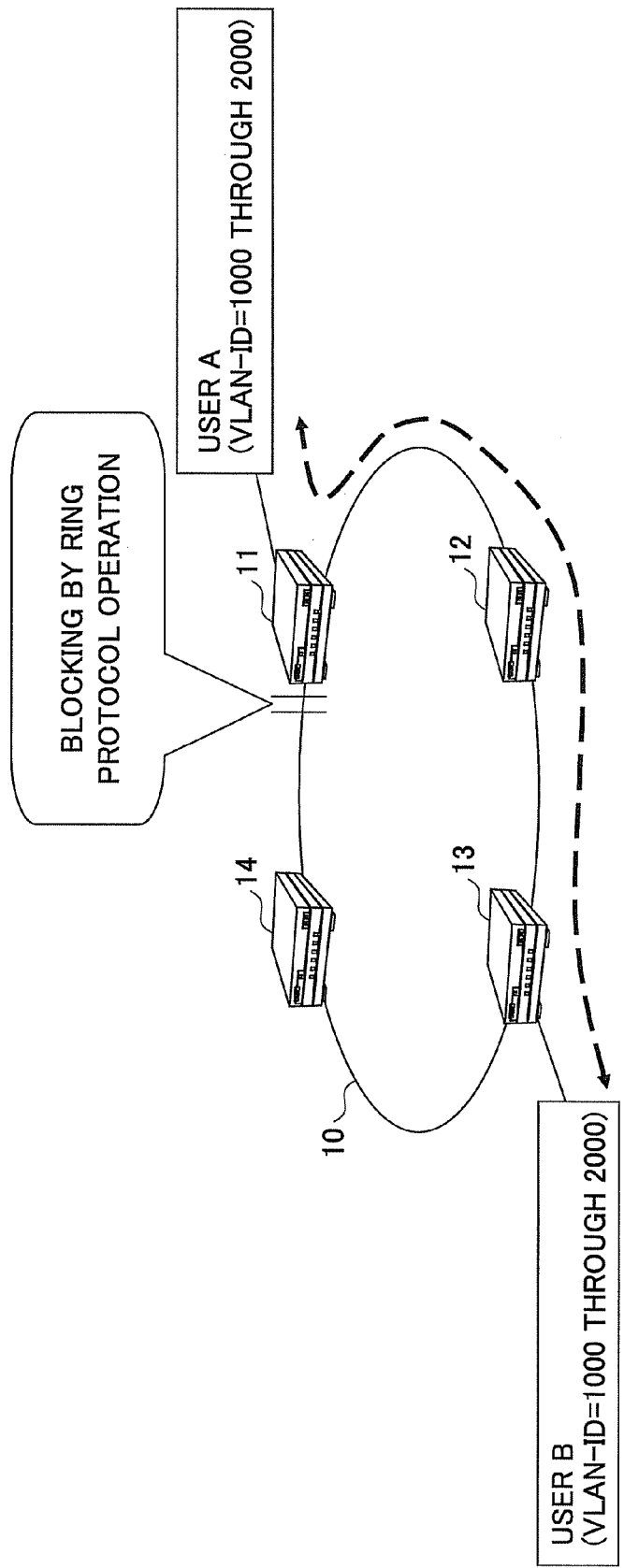
FIG. 1 depicts a configuration of one example of a ring network.

FIG. 1 depicts one example of a ring network. As depicted in FIG. 1, bridge apparatuses 11, 12, 13 and 14 are connected in a ring manner to form a ring network 10. In the ring network 10, a ring protocol is executed, and a port of the bridge apparatus 11 connecting with the bridge apparatus 14 is logically blocked, as depicted in FIG. 1.

Thereby, a data frame from a user A to a user B is transferred with the use of a route of the bridge apparatuses 11, 12 and 13 uniquely. Further, when a fault occurs in the ring network 10, a blocking point may be dynamically changed, and a route having no fault is used to re-start communication.

According to VLAN (Virtual Local Area Network) technology, such a virtual network may be provided which is not limited by a physical connection. According to VLAN technology, by means of a function of a switch apparatus (layer-3 switch, layer-2 switch or such), a broadcast domain is divided into plural virtual networks (broadcast domains).

Further, VLAN has various types concerning how to create virtual networks, i.e., a port-base VLAN, a tag VLAN and so forth. According to tag VLAN technology, a VLAN tag field (4 bytes) is attached to a LAN frame, and thereby, a single port of a switch apparatus can be made to belong to plural virtual networks. Tag VLAN technology is prescribed in IEEE 802.1Q.

A VLAN tag field is inserted between a transmission source field and a type field, and includes a tag protocol identifier (TPID) and tag control information (TCI). In TCI, a VLAN-ID (12 bits) (virtual network identifier) is set. The VLAN-ID is information used for identifying a virtual network obtained from dividing a broadcast domain, and numerical values from 1 through 4094 are available.

In the ring network depicted in FIG. 1, it is preferable to periodically confirm that transfer of data frames of all VLAN-IDs which a user uses is carried out properly, and, to determine a VLAN ID for which a fault has occurred if the fault occurs. Otherwise, when a signal of a specific VLAN-ID does not pass through the ring network because of the fault, transfer of a main signal may be interrupted.

In such a case, a node (bridge apparatus) having the fault and a corresponding VLAN-ID may be found out manually, setting of the VLAN-ID may be changed, and transfer of the main signal may be restored. Thus, a time period required for restoring the ability to transfer the main signal may increase.

A bridge apparatus according to the embodiment of the present invention can rapidly recover from interruption of transfer of a signal for a virtual network identifier.

Below, the embodiment of the present invention will be described in details with reference to figures.

<Configuration of Bridge Apparatus>

Figure 2:
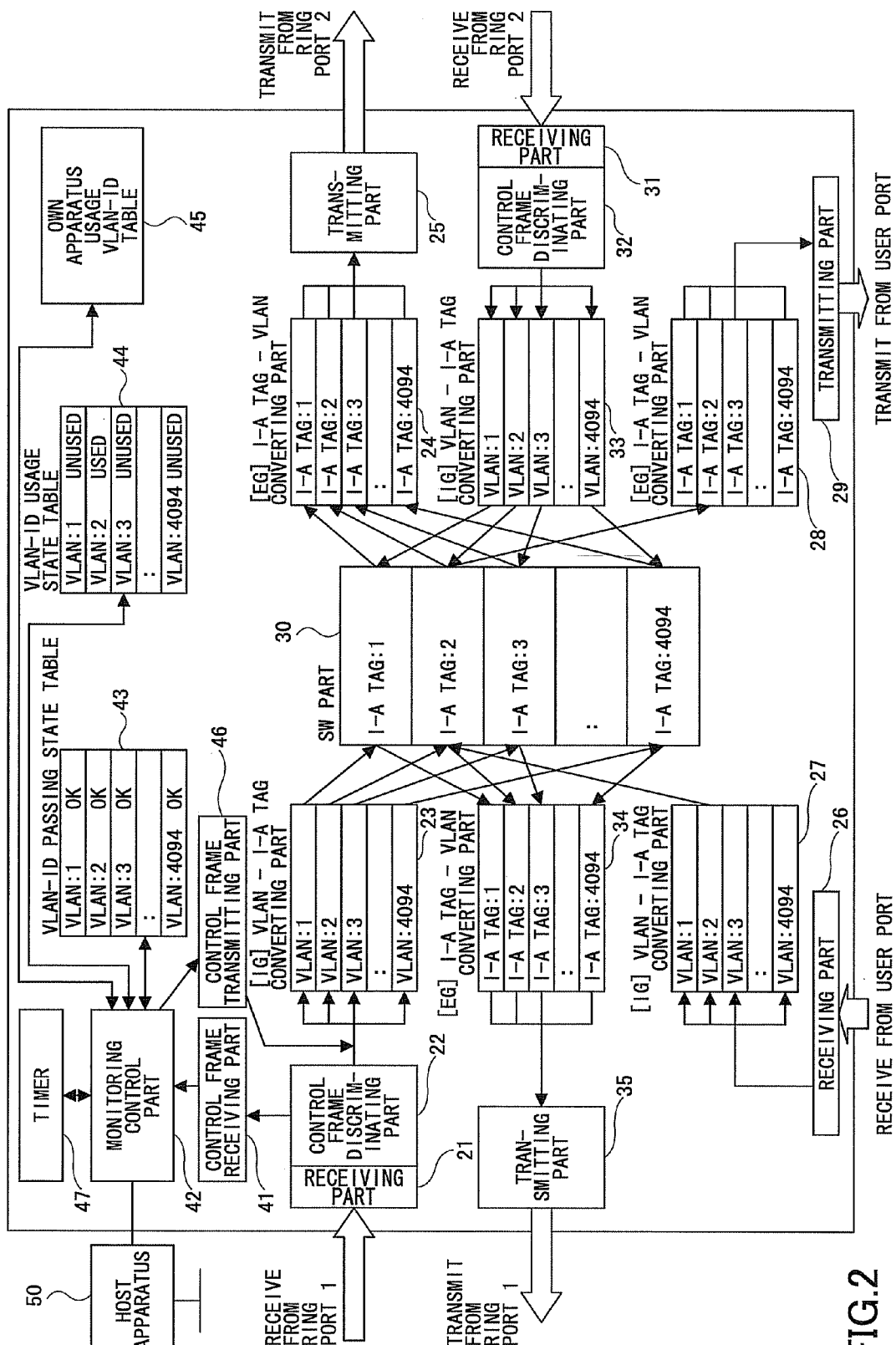
FIG. 2 depicts a configuration of a bridge apparatus in the embodiment of the present invention.

FIG. 2 depicts a configuration of a bridge apparatus according to the embodiment of the present invention. It is noted that, in FIG. 2, "INSIDE-APPARATUS TAG" is simply referred to as "I-A TAG" in each occurrence. The bridge apparatus is a representative node of a ring network. The bridge apparatus collects states of occurrence of a fault (VLAN-ID passing state) and a signal usage state in the ring network, and automatically sends instructions to respective nodes (bridge apparatuses) in the ring network, when detecting a fault, for changing settings. It is noted that, for all the nodes other than the bridge apparatus as the representative node of the ring network, a VLAN-ID passing state table 43 and a VLAN-ID usage state table 44 are not necessary.

In FIG. 2, a ring port 1 for a ring connection has, for receiving frames, a receiving part 21 which receives frames from the ring port 1, a control frame discriminating part 22 which discriminates and extracts a control frame from the received frames, and a VLAN—inside-apparatus tag converting part 23 which converts a VLAN-ID in a frame to an inside-apparatus tag. The ring port 1 further has, for transmitting frames, an inside-apparatus tag—VLAN converting part 24 which converts an inside-apparatus tag into a VLAN-ID, and a transmitting part 25 which transmits frames from the ring port 1.

It is noted that an inside-apparatus tag means a management identifier which is assigned to each group of subscribers, for the purpose of dividing communications carried out among different subscribers. Communications are allowed only within a group of subscribers to which one inside-apparatus tag is assigned.

In FIG. 2, a ring port 2 for a ring connection has, for receiving frames, a receiving part 31 which receives frames from the ring port 2, a control frame discriminating part 32 which discriminates and extracts a control frame from received frames, and a VLAN—inside-apparatus tag converting part 33 which converts a VLAN-ID in a frame to an inside-apparatus tag. The ring port 2 further has, for transmitting frames, an inside-apparatus tag—VLAN converting part 34 which converts an inside-apparatus tag into a VLAN-ID, and a transmitting part 35 which transmits frames from the ring port 2.

In FIG. 2, a user port has, for receiving frames, a receiving part 26 which receives frames from the user port, and a VLAN—inside-apparatus tag converting part 27 which converts a VLAN-ID in a frame to an inside-apparatus tag. The user port further has, for transmitting frames, an inside-apparatus tag—VLAN converting part 28 which converts an inside-apparatus tag into a VLAN-ID, and a transmitting part 29 which transmits frames from the user port.

The switch part 30 receives a frame from any one of the VLAN—inside-apparatus tag converting parts 23, 27 and 33, and provides the frame to any one of the inside-apparatus tag—VLAN converting parts 24, 28 and 34, selectively.

Frames (pass checking frames, usage state checking frames and VLAN connection changing frames) extracted by the control frame discriminating parts 22 and 32 are received by a control frame receiving part 41, and are provided to a monitoring control part 42.

The monitoring control part 42 creates a VLAN-ID passing state table 43 and a VLAN-ID usage state table 44 based on received control frames, and reads these tables 43 and 44. In the VLAN-ID passing state table 43, a passing or non-passing state in the ring network is stored for each VLAN-ID. In the VLAN-ID usage state table 44, a used or unused state of each VLAN-ID in the ring network is stored.

Further, the monitoring control part 42 creates and reads an own apparatus using VLAN-ID table 45, according to an instruction from a host apparatus 50. In the own apparatus using VLAN-ID table 45, VLAN-IDs used by the own apparatus are stored.

Furthermore, the monitoring control part 42 creates a control frame, i.e., a pass checking frame, a usage state checking frame or a VLAN connection changing frame, and provides the frame to the control frame transmitting part 46.

A timer 47 generates a trigger for when a pass checking frame or a usage state checking frame is generated. Further, the timer 47 determines whether a time having elapsed from transmission of a control frame to reception of the control frame corresponds to time-out.

The control frame transmitting part 46 provides a pass checking frame, a usage state checking frame or a VLAN connection changing frame to the VLAN—inside-apparatus tag converting parts 23 or 33, and transmits the frame from the ring port 1 or 2. It is noted that control frames are ordinarily transmitted from a blocking port which is set at a single point in the ring.

<Ring Network>

Figure 3A:
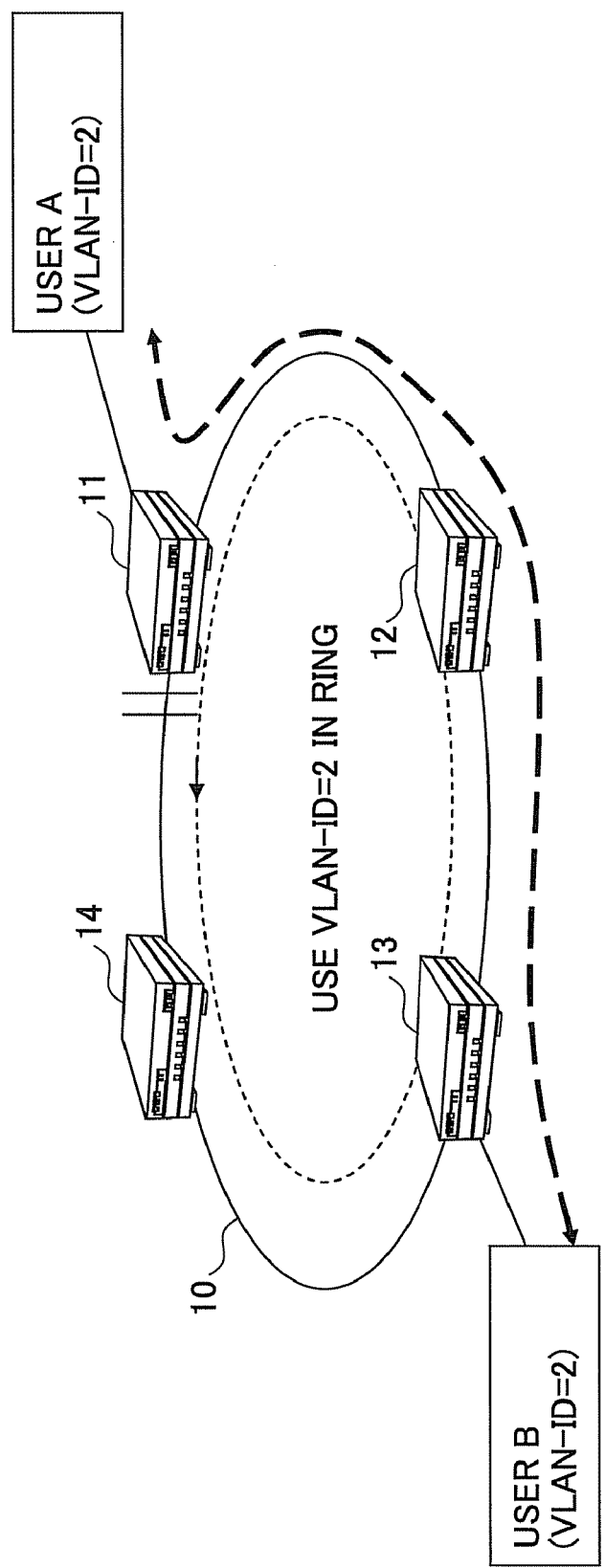

FIGS. 3A, 3B and 3C illustrate operation of the ring network in the embodiment of the present invention. As depicted in FIG. 3A, the ring network 10 includes bridge apparatuses 11, 12, 13 and 14 which are connected in a ring manner. Further, as depicted in FIG. 3A, a port of the bridge apparatus 11 connecting with the bridge apparatus 14 is blocked. In the ring network 10, the bridge apparatus 11 is a node acting as a representative of the ring network 10. The bridge apparatus 11 has the ring port 1 connected to the bridge apparatus 14 and the ring port 2 connected to the bridge apparatus 12.

<VLAN-ID Passing State>

FIG. 4 depicts a frame format of a pass checking frame in the embodiment of the present invention. In FIG. 4, DA denotes a designation address, and SA denotes a transmission source address. A VLAN tag has a type value of 2 bytes (0xFFF0 indicating as being a pass checking frame, and 0x indicating as hexadecimal expression), and tag control information including VLAN-ID of 10 bits. TYPE is a type value of 2 bytes. A "data part" (DATA PART) has any value. FCS is frame error check data of 4 bytes.

When receiving a pass checking frame for VLAN-ID=1 from the ring port 1 which is opposite to the ring port 1 from which the pass checking frame was transmitted, the bridge apparatus 11 stores "passing (OK): 1" for VLAN-ID=1 in the VLAN-ID passing state table 43. After that, VLAN-ID is incremented by +1, and the pass checking frame is transmitted to the bridge apparatus 14 from the ring port 1.

The bridge apparatus 11 starts the timer 47 when transmitting a pass checking frame for a case where a signal for a specific VLAN-ID does not pass the ring network. When time-out occurs, the bridge apparatus 11 stores "non-passing: 0" for the specific VLAN-ID in the VLAN-ID passing state table 43, and transmits a pass checking frame storing a next VLAN-ID.

The bridge apparatus 11 repeats transmission of a pass checking frame until VLAN-ID=4094 is reached, and thus, completes the VLAN-ID passing state table 43.

When receiving a pass checking frame from one ring port (for example, the ring port 1), each of the other bridge apparatuses 12, 13 and 14 other than the representative 11 transmits the pass checking from the opposite ring port (the ring port 2 in the example).

<VLAN-ID Usage State>

The bridge apparatus 11 acting as the representative transmits a usage state checking frame in which, in a data part, a VLAN-ID usage state of the own apparatus is set, to the bridge apparatus 14 from a blocking port (the ring port 1).

FIG. 5 depicts a frame format of a usage state checking frame in the embodiment of the present invention. In FIG. 5, DA denotes a designation address, and SA denotes a transmission source address. A VLAN tag has a type value of 2 bytes (0xFFF1 indicating as being a usage state checking frame), and tag control information including VLAN-ID of 10 bits. TYPE is a type value of 2 bytes. A "data part" (DATA PART) is a bit sequence of 4094 bits. FCS is frame error check data of 4 bytes.

Each bit of the bit sequence of 4094 bits in the data part corresponds to a respective one of VLAN-ID=1 through VLAN-ID=4094. When an own apparatus uses VLAN-ID=1, 2, the first and second bits of 4094 bits are "1", "1", respectively, and each of the other bits is "0". The VLAN-ID which the own apparatus uses is/are stored in the own apparatus using VLAN-ID table 45 by the monitoring control part 42.

When receiving a usage state checking frame from the ring port 2 opposite to the ring port 1 from which the usage state checking frame has been transmitted, the bridge apparatus 11 stores the data part of the received frame in the VLAN-ID usage state table 44. Thus, the bridge apparatus 11 grasps VLAN-ID usage states for the entire ring.

The bridge apparatus 11 starts the timer 47 when transmitting a usage state checking frame, and stores "used: 1" in the VLAN-ID usage state table 44 for all the VLAN-IDs when time-out occurs.

When receiving a usage state checking frame from a ring port (for example, the ring port 1), each of the bridge apparatuses 12, 13 and 14, other than the representative 11, overwrites a bit of the data part of the received frame, which bit corresponds to the VLAN-ID used by the own apparatus, with a bit value "1", and thus, updates the usage state checking frame. For a bit of the data part of the received frame, which bit corresponds to VLAN-ID not used by the own apparatus, the bridge apparatus leaves the bit as it is. The bridge apparatus then transmits the thus-updated usage state checking frame from the opposite ring port (the ring port 2 in the example).

<VLAN-ID Change>

When finding, from the VLAN-ID usage state table 44, a VLAN-ID (referred to as VLAN-ID [A], hereinafter) which is "used", and also "non-passing" in the VLAN-ID passing state table 43, the bridge apparatus 11 acting as the representative transmits a VLAN connection changing frame from any ring port (ordinarily, a blocking port which is provided at a single point in the ring), for allowing a signal to pass through the ring with the use of a VLAN-ID (referred to as VLAN-ID [A], hereinafter) which is in an "unused" state and in a "passing" state, circulates the VLAN-connection changing frame through the ring network and thus changes settings in the bridge apparatuses included in the ring network.

That is, when VLAN-ID of a user port is connected to an inside-apparatus tag [A] corresponding to VLAN [A] in the ring port, the bridge apparatus 11 acting as the representative changes the connection so that the VLAN-ID of the user port is connected to an inside-apparatus tag [B] corresponding to VLAN [B] in the ring port. Then, the bridge apparatus 11 changes the VLAN-ID usage state table 44 for VLAN [B] to "used: 1".

Further, the bridge apparatus 11 transmits a VLAN connection changing frame, in which VLAN [A], VLAN [B] are set in the data part, to the bridge apparatus 14 from the blocking port (ring port 1).

FIG. 6 depicts a frame format of a VLAN connection changing frame in the embodiment of the present invention. In FIG. 6, DA denotes a designation address, and SA denotes a transmission source address. A VLAN tag has a type value of 2 bytes (0xFFF2 indicating as being a VLAN connection changing frame), and tag control information including VLAN-ID of 10 bits. TYPE is a type value of 2 bytes. In a "data part" (DATA PART), the first 2 bytes indicate "original VLAN-ID" and the next 2 bytes indicate "changed VLAN-ID". FCS is frame error check data of 4 bytes.

When receiving a VLAN connection changing frame from the ring port 2 opposite to the ring port 1 from which the VLAN connection changing frame has been transmitted, the bridge apparatus 11 acting as the representative changes the VLAN-ID usage state table for VLAN [A] to "unused: 0".

Further, the bridge apparatus 11 starts the timer 47 when transmitting the VLAN connection changing frame, and carries out nothing (stops) when time-out occurs.

When receiving a VLAN connection changing frame, and in a case where the VLAN-ID of a user port is connected to an inside-apparatus tag [A] corresponding to VLAN [A] written as the original VLAN-ID of the received VLAN connection changing frame, each of the bridge apparatuses 12, 13 and 14 other than the representative 11 changes the connection so that the VLAN-ID of the user port is connected to an inside-apparatus tag [B] corresponding to VLAN [B] written as the changed VLAN-ID of the received VLAN connection changing frame.

<Process for Pass Checking Frame>

Figure 7:
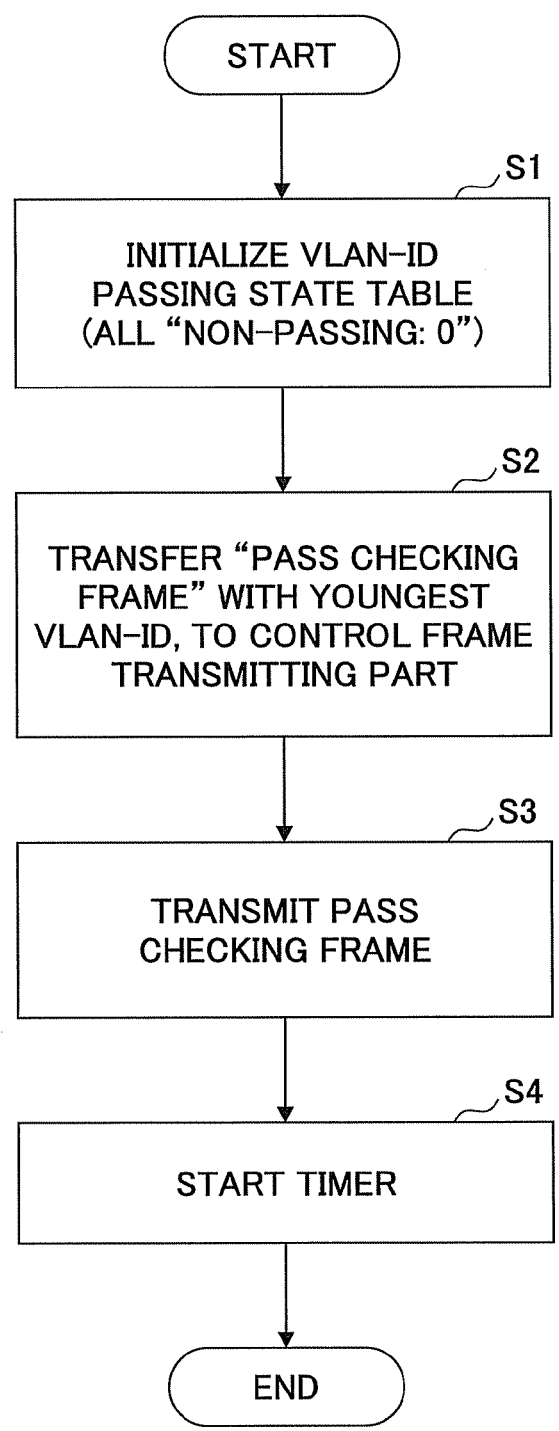
FIG. 7 depicts a flowchart of a pass checking frame transmitting process.

FIG. 7 depicts a flowchart of a pass checking frame transmitting process carried out by the bridge apparatus 11 acting as the representative. The process is started each time when the timer 47 measures a predetermined time period (for example, seconds).

In step S1, the monitoring control part 42 initializes the VLAN-ID passing state table 43 for all the VLAN-IDs to "non-passing: 0".

In step S2, the monitoring control part 42 provides a pass checking frame with VLAN-ID as the youngest number (=1) to the control frame transmitting part 46.

In step S3, the control frame transmitting part 46 provides the pass checking frame to the VLAN—inside-apparatus tag converting part 23 for transmitting the pass checking frame, starts the time 47 in step S3, and finishes the process.

Figure 8:
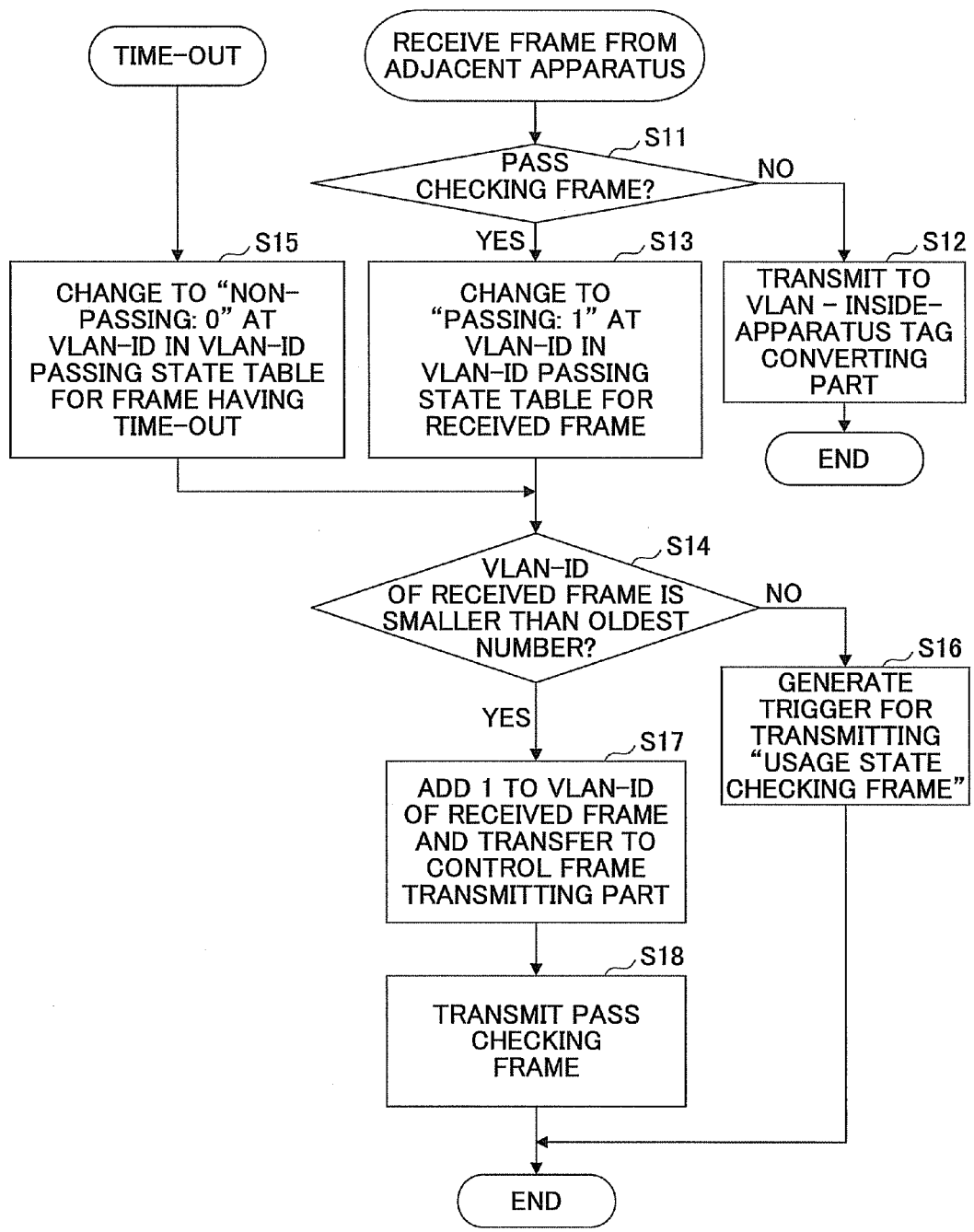
FIG. 8 depicts a flowchart of a pass checking frame receiving process.

FIG. 8 depicts a flowchart of a pass checking frame receiving process carried out by the bridge apparatus 11 acting as the representative. This process is started when the bridge apparatus 11 receives a frame from the adjacent bridge apparatus 12 or when the timer 47 generates time-out.

When receiving a frame from the adjacent bridge apparatus 12, the control frame discriminating part 32 determines in step S11 whether the frame is a pass checking frame. When the frame is not a pass checking frame, the control frame discriminating part 32 transmits the received frame to the VLAN—inside-apparatus tag converting part 23 in step S12.

When the received frame is a pass checking frame, the monitoring control part 42 stores "passing: 1" in the VLAN-ID passing state table 43 for VLAN-ID of the received pass checking frame in step S13, and step S14 is then carried out.

On the other hand, when the timer 47 generates time-out after the transmission of the pass checking frame, the monitoring control part 42 stores "non-passing: 0" in the VLAN-ID passing state table 43 for VLAN-ID of the pass checking frame for which time-out is thus generated, in step S15, and step S14 is then carried out.

In step S14, the monitoring control part 42 determines whether the VLAN-ID of the pass checking frame which is received or for which time-out is generated is smaller than the oldest number (=4094). When VLAN-ID is equal to or more than the oldest number, the monitoring control part 42 generates a trigger for transmitting a usage state checking frame, in step S16, and finishes the process.

When the VLAN-ID is smaller than the oldest number, the monitoring control part 42 increments a value of the VLAN-ID of the pass checking frame which is received or for which time-out is generated by +1, and transfers the pass checking frame to the control frame transmitting part 46, in step S17. In step S18, the control frame transmitting part 46 transmits the pass checking frame.

Figure 9:
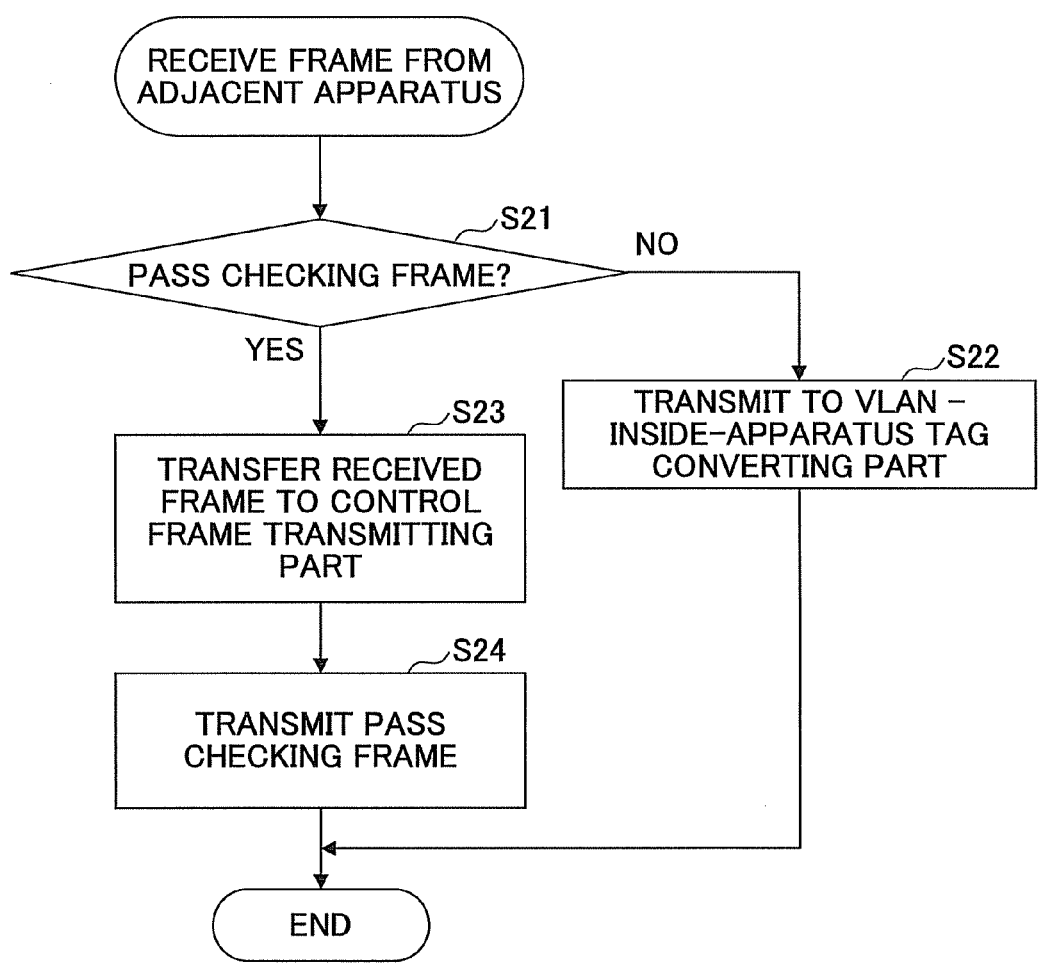
FIG. 9 depicts a flowchart of a pass checking frame receiving process.

FIG. 9 depicts a flowchart of a pass checking frame receiving process carried out by each of the bridge apparatuses 12, 13 and 14 other then the representative 11. This process is started when the bridge apparatus receives a frame from the adjacent bridge apparatus.

In step S21, the control frame discriminating part 43 determines whether the received frame is a pass checking frame. When the received frame is not a pass checking frame, the control frame discriminating part 43 transmits the received frame to the VLAN—inside-apparatus tag converting part 23, in step S22.

When the received frame is a pass checking frame, the monitoring control part 42 transfers the received pass checking frame to the control frame transmitting part 46, in step S23. In step S24, the control frame transmitting part 46 transmits the pass checking frame.

<Process for Usage State Checking Frame>

Figure 10:
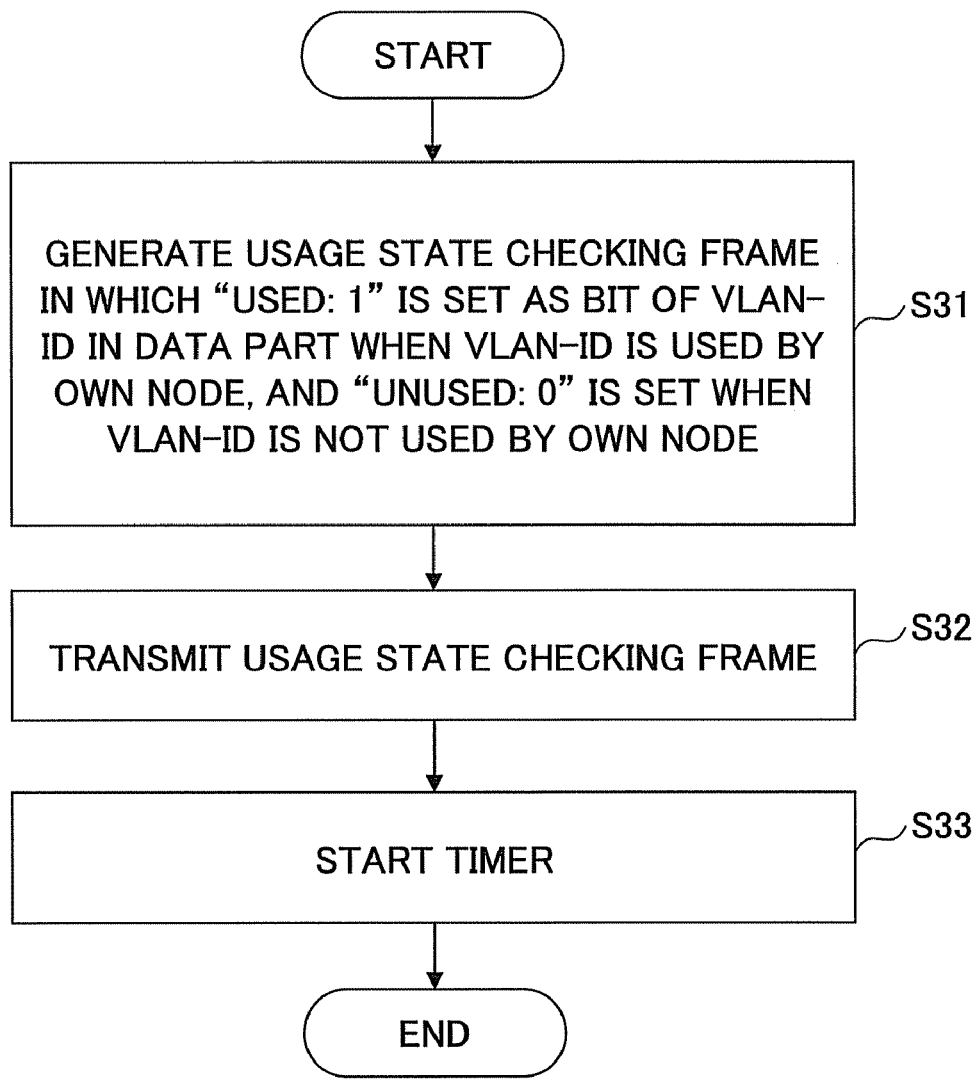
FIG. 10 depicts a flowchart of a usage state checking frame transmitting process.

FIG. 10 depicts a flowchart of a usage state checking frame transmitting process carried out by the bridge apparatus 11 acting as the representative. This process is carried out when the monitoring control part 42 generates the trigger for transmitting a usage state checking frame in step S16 of FIG. 8.

In step S31, the monitoring control part 42 generates a usage state checking frame in which, in a data part, a usage state of VLAN-ID in the own apparatus (the bridge apparatus 11) is written. Specifically, first, "0" is set in all the 4094 bits of the data part of the usage state checking frame, and then, "1" is set in a bit corresponding to VLAN-ID used by the own apparatus (the bridge apparatus 11).

Next, in step S32, the control frame transmitting part 46 provides the usage state checking frame to the VLAN—inside-apparatus tag converting part 23 for transmitting the usage state checking frame. In step S33, the timer 47 is started, and the process is finished.

Figure 11:
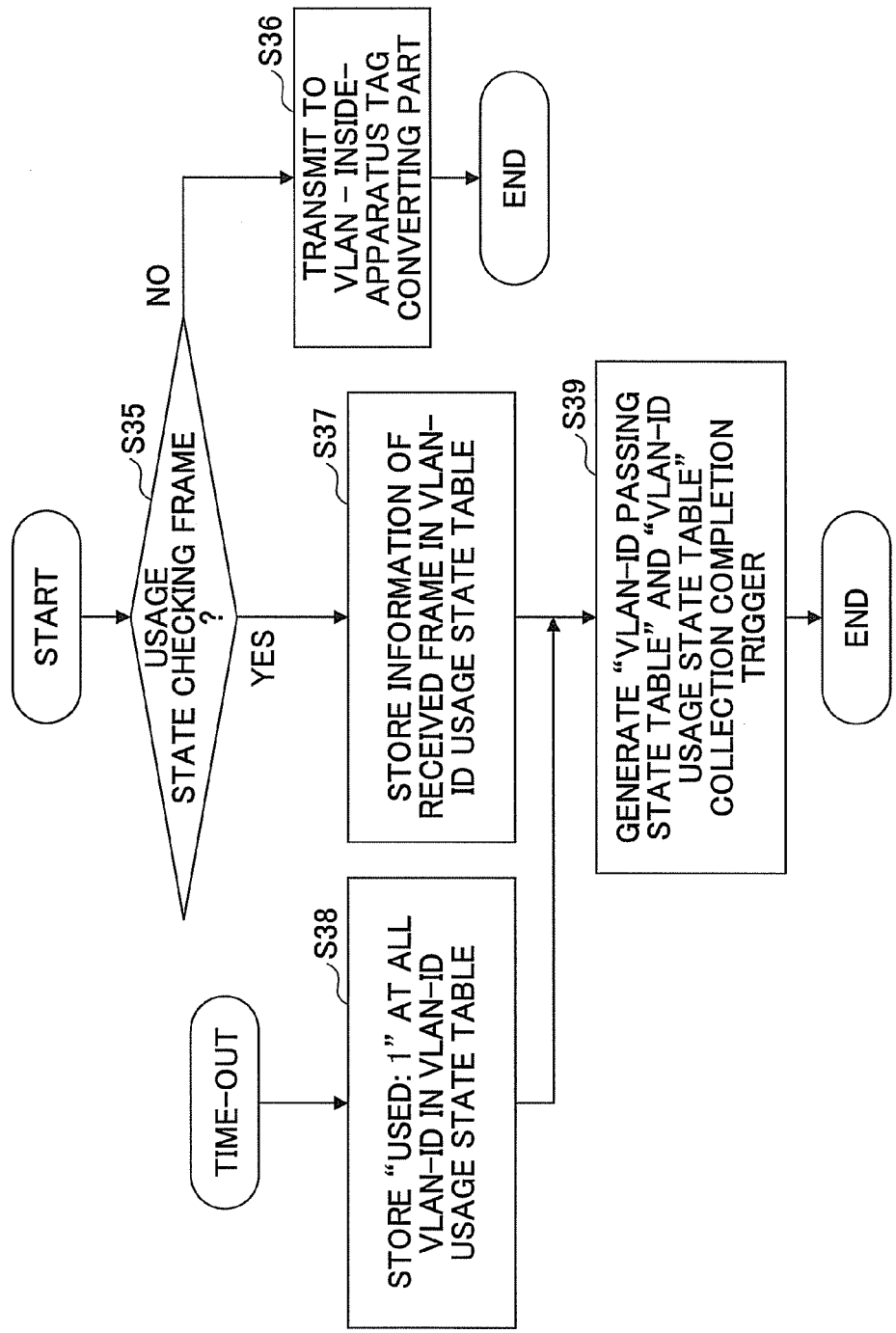
FIG. 11 depicts a flowchart of a usage state checking frame receiving process.

FIG. 11 depicts a flowchart of a usage state checking frame receiving process carried out by the bridge apparatus 11 acting as the representative. This process is started when the bridge apparatus 11 receives a frame from the adjacent bridge apparatus 12, or when the timer 47 generates time-out.

When receiving a frame from the adjacent bridge apparatus 12, the control frame discriminating part 32 determines whether the received frame is a usage state checking frame in step S35. When the received frame is not the usage state checking frame, the control frame discriminating part 32 transfers the received frame to the VLAN—inside-apparatus tag converting part 23 in step S36.

When the received frame is a usage state checking frame, the monitoring control part 42 stores the contents of 4094 bits of the data part of the usage state checking frame in the respective parts of the VLAN-ID usage state table 44, in step S37.

On the other hand, when the timer 47 generates time-out after the transmission of the usage state checking frame, the monitoring control part 42 stores "used: 1" in the VLAN-ID usage state table 44 for all the VLAN-IDs, in step S38.

After the execution of step S37 or S38, the monitoring control part 42 generates a trigger of completion of collection for the VLAN-ID passing state table 43 and the VLAN-ID usage state table 44, in step S39, and finishes the process.

Figure 12:
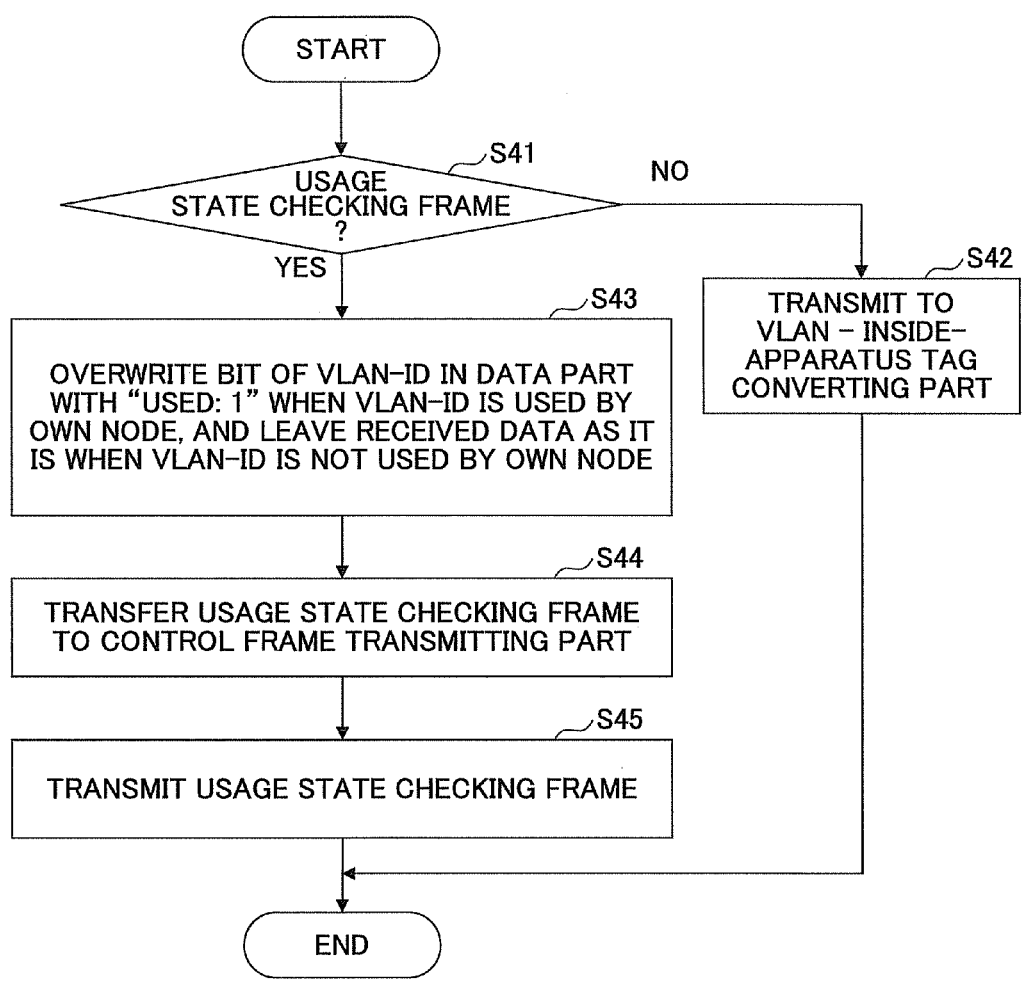
FIG. 12 depicts a flowchart of a usage state checking frame receiving process.

FIG. 12 depicts a flowchart of a usage state checking frame receiving process carried out by each of the bridge apparatuses 12, 13 and 14 other than the representative. This process is started when the bridge apparatus receives a frame from the adjacent bridge apparatus.

In step S41, the control frame discriminating part 32 determines whether the received frame is a usage state checking frame. When the received frame is not a usage state checking frame, the control frame discriminating part 32 transmits the received frame to the VLAN—inside-apparatus tag converting part 23 in step S42.

When the received frame is a usage state checking frame, the monitoring control part 42 overwrites, with a value "1", a bit corresponding to the VLAN-ID used by the own apparatus of the 4094 bits of the data part of the received usage state checking frame, and leaves the other bits as they are, in step S43. Then, in step S44, the monitoring control part 42 transfers the usage state checking frame to the control frame transmitting part 46. In step S46, the control frame transmitting part 46 transmits the usage state checking frame, and the process is finished.

<Process for Connection Changing Frame>

Figure 13:
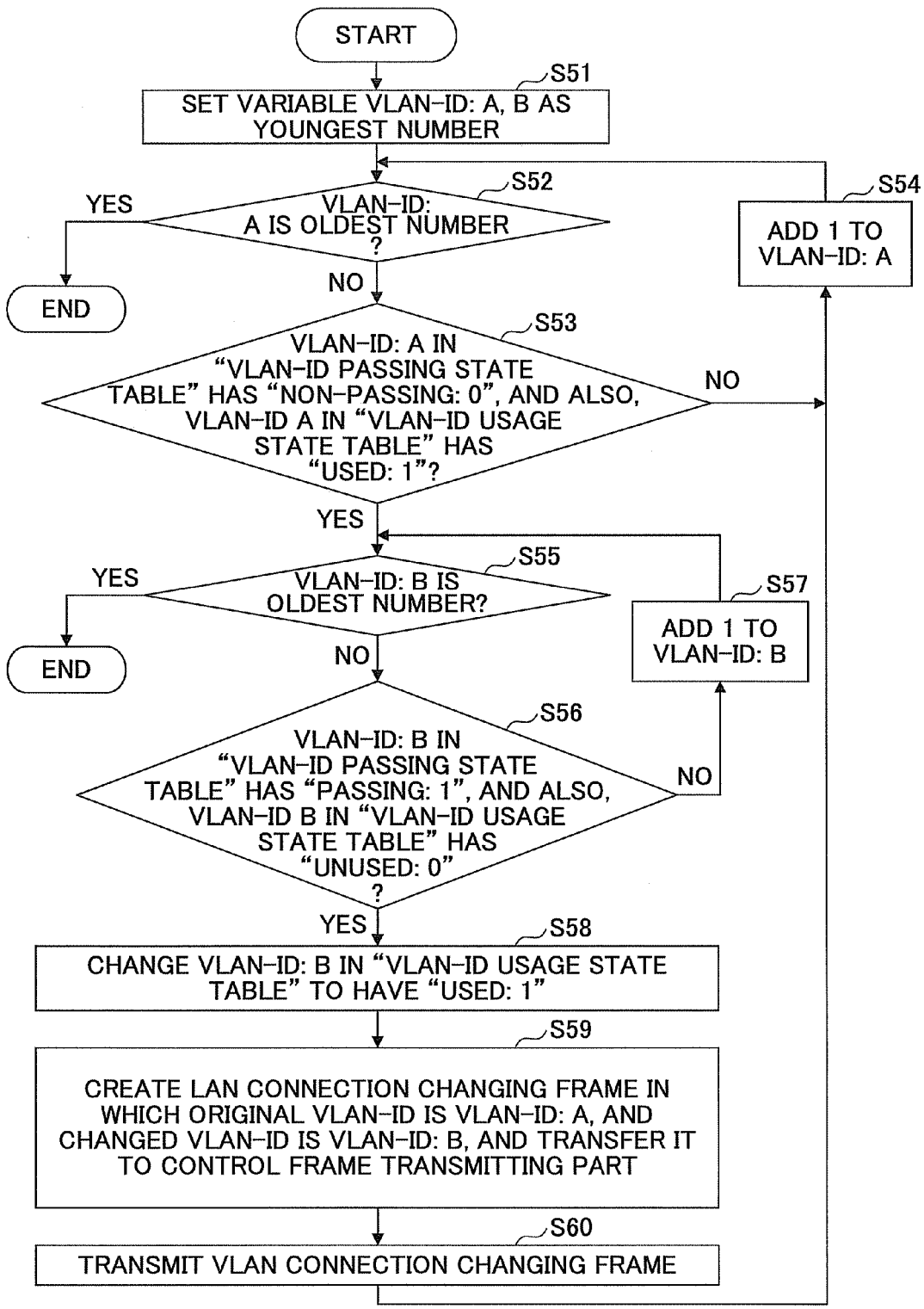
FIG. 13 depicts a flowchart of a connection changing frame transmitting process.

FIG. 13 depicts a flowchart of a connection changing frame transmitting process carried out by the bridge apparatus 11 acting as the representative. This process is started when the monitoring control part 42 generates the trigger of completion of collection for the VLAN-ID passing state table 43 and the VLAN-ID usage state table 44 in step S39 of FIG. 11.

In step S51, the monitoring control part 42 sets the youngest number in each of VLAN-ID: A and VLAN-ID: B. Next, in step S52, the monitoring control part 42 determines whether VLAN-ID: A is the oldest number. When VLAN-ID: A is the oldest number, the process is finished. When VLAN-ID: A is not the oldest number, the monitoring control part 42 determines whether a record in the VLAN-ID passing state table 43 corresponding to VLAN-ID: A indicates "non-passing: 0", and also, whether a record in the VLAN-ID usage state table 44 corresponding to VLAN-ID: A indicates "used: 1", in step S53. When a result of the determination is NO, the monitoring control part 42 increments a value of VLAN-ID: A by +1 in step S54, and then, step S52 is carried out. When a result of the determination in step S53 is YES, step S55 is carried out.

In step S55, the monitoring control part 42 determines whether VLAN-ID: B is the oldest number. When VLAN-ID: B is the oldest number, the process is finished. When VLAN-ID: B is not the oldest number, the monitoring control part 42 determines whether a record in the VLAN-ID passing state table 43 corresponding to VLAN-ID: B indicates "passing: 1", and also, a record in the VLAN-ID usage state table 44 corresponding to VLAN-ID: B indicates "unused: 0". When a result of the determination is NO, the monitoring control part 42 increments a value of VLAN-ID: B by +1 in step S57, and then, step S55 is carried out. When a result of the determination in step S56 is YES, step S58 is carried out.

In step S58, the monitoring control part 42 changes a record of the VLAN-ID usage state table 44 corresponding to VLAN-ID: B to "used: 1". In step S59, the monitoring control part 42 creates a VLAN connection changing frame in which the original VLAN-ID is set as VLAN-ID: A and the changed VLAN-ID is set as VLAN-ID: B, and transfers the VLAN connection changing frame to the control frame transmitting part 46. Then, in step S60, the control frame transmitting part 46 transmits the VLAN connection changing frame. After that, in step S54, a value of VLAN-ID: A is incremented by +1, and then, step S52 is carried out.

Figure 14:
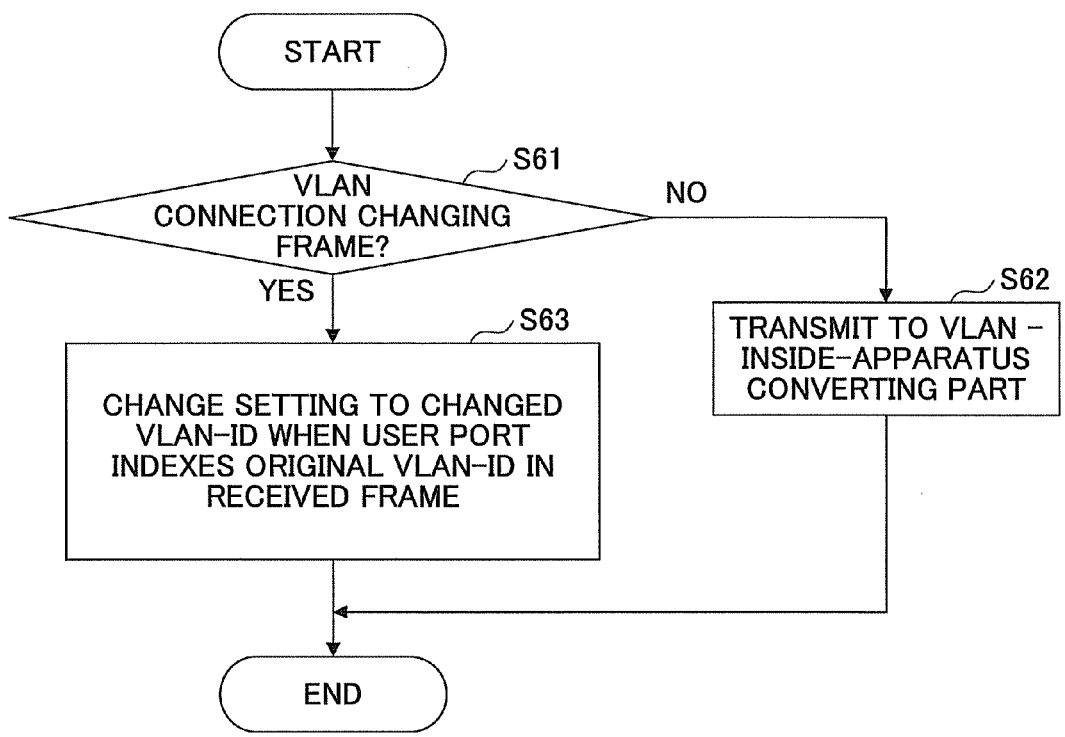
FIG. 14 depicts a flowchart of a VLAN connection changing frame receiving process.

FIG. 14 depicts a flowchart of a VLAN connection changing frame receiving process carried out by the bridge apparatus 11 acting as the representative. This process is started when the bridge apparatus 11 receives a frame from the adjacent bridge apparatus 12.

When receiving a frame from the adjacent bridge apparatus 12, the control frame discriminating part 32 determines whether the received frame is a VLAN connection changing frame, in step S61. When the received frame is not a VLAN connection changing frame, the control frame discriminating part 32 transfers the received frame to the VLAN—inside-apparatus tag converting part 23, in step S62.

When the received frame is a VLAN connection changing frame, in a case where a user port of the own apparatus indexes the original VLAN-ID indicated by the received VLAN connection changing frame, the monitoring control part 42 changes a setting according to the received VLAN connection changing frame in step S63 so that the original VLAN-ID is converted into the changed VLAN-ID indicated by the received VLAN connection changing frame when a frame is received from the outside of the ring network, or the changed VLAN-ID is converted into the original VLAN-ID when a frame is transmitted to the outside of the ring network. That is, when VLAN-ID corresponding to a specific inside-apparatus tag agrees with the original VLAN-ID indicated by the received VLAN connection changing frame in the VLAN—inside-apparatus tag converting part 27 or the inside-apparatus tag—VLAN converting part 28, the setting in the VLAN—inside-apparatus tag converting part 27 or the inside-apparatus tag—VLAN converting part 28 is changed such that, the original VLAN-ID is converted by the VLAN—inside-apparatus tag converting part 27 into a specific inside apparatus tag corresponding to the changed VLAN-ID indicated by the received VLAN connection changing frame when a frame is received from the outside of the ring network, or the specific inside apparatus tag is converted by the inside-apparatus tag—VLAN converting part 28 into the original VLAN-ID when a frame is transmitted to the outside of the ring network.

Figure 15:
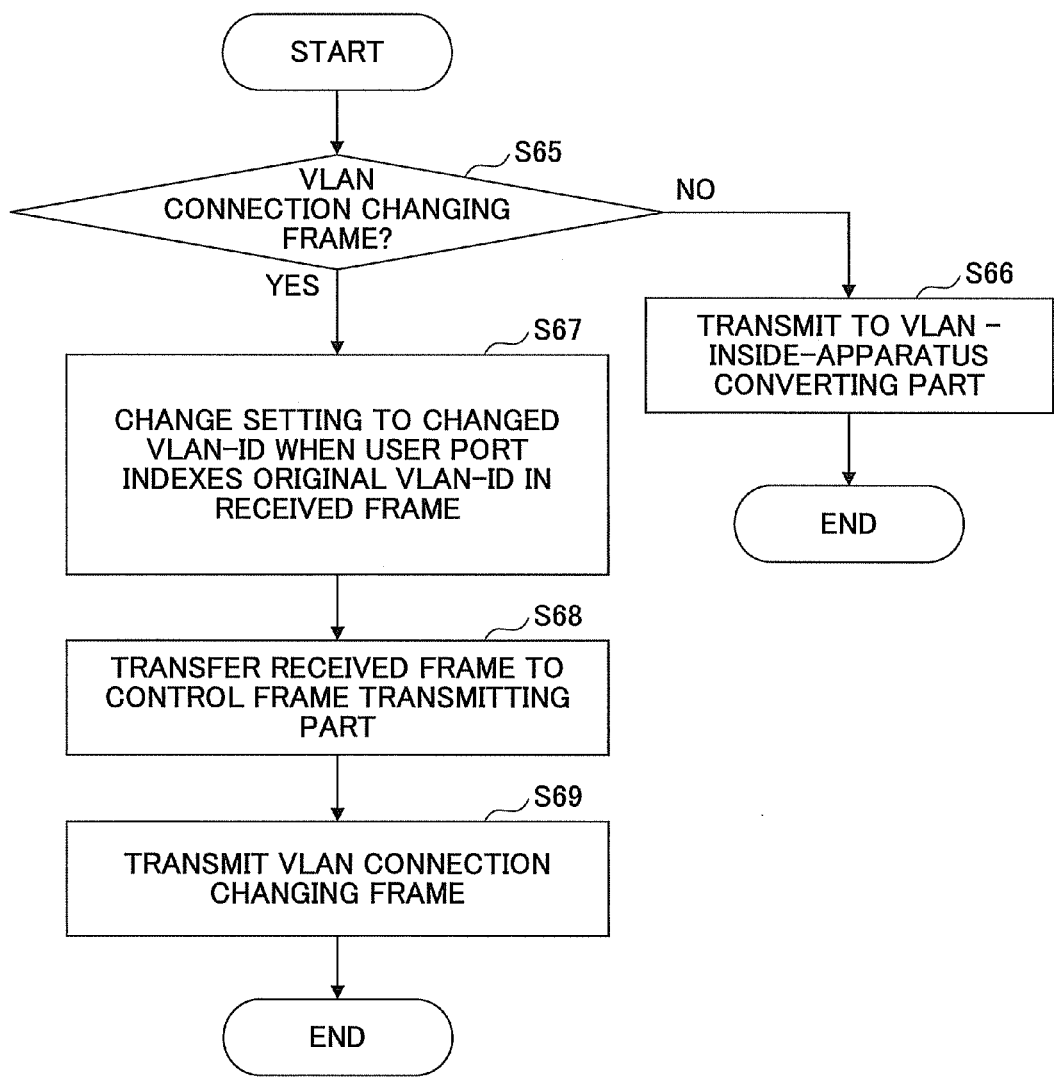
FIG. 15 depicts a flowchart of a VLAN connection changing frame receiving process.

FIG. 15 depicts a flowchart of a VLAN connection changing frame receiving process carried out by each of the bridge apparatuses 12, 13 and 14 other than the representative. This process is started when the bridge apparatus receives a frame from the adjacent bridge apparatus.

When receiving a frame from the adjacent bridge apparatus, the control frame discriminating part 32 determines whether the received frame is a VLAN connection changing frame in step S65. When the received frame is not a VLAN connection changing frame, the control frame discriminating part 32 transfers the received frame to the VLAN—inside-apparatus tag converting part 23 in step S66.

When the received frame is a VLAN connection changing frame, in a case where a user port of the own apparatus indexes the original VLAN-ID indicated by the received VLAN connection changing frame, the monitoring control part 42 changes a setting according to the received VLAN connection changing frame in step S67 so that the original VLAN-ID is converted into the changed VLAN-ID indicated by the received VLAN connection changing frame when a frame is received from the outside of the ring network, or the changed VLAN-ID is converted into the original VLAN-ID when a frame is transmitted to the outside of the ring network. That is, when VLAN-ID corresponding to a specific inside-apparatus tag agrees with the original VLAN-ID indicated by the received VLAN connection changing frame in the VLAN—inside-apparatus tag converting part 27 or the inside-apparatus tag—VLAN converting part 28, the setting in the VLAN—inside-apparatus tag converting part 27 or the inside-apparatus tag—VLAN converting part 28 is changed such that, the original VLAN-ID is converted by the VLAN— inside-apparatus tag converting part 27 into a specific inside apparatus tag corresponding to the changed VLAN-ID indicated by the received VLAN connection changing frame when a frame is received from the outside of the ring network, or the specific inside apparatus tag is converted by the inside-apparatus tag—VLAN converting part 28 into the original VLAN-ID when a frame is transmitted to the outside of the ring network.

Then, in step S68, the monitoring control part 42 transfers the received VLAN connection changing frame to the control frame transmitting part 46. In step S69, the control frame transmitting part 46 transmits the VLAN connection changing frame, and the process is finished.

<Ring Network>

Figure 16:
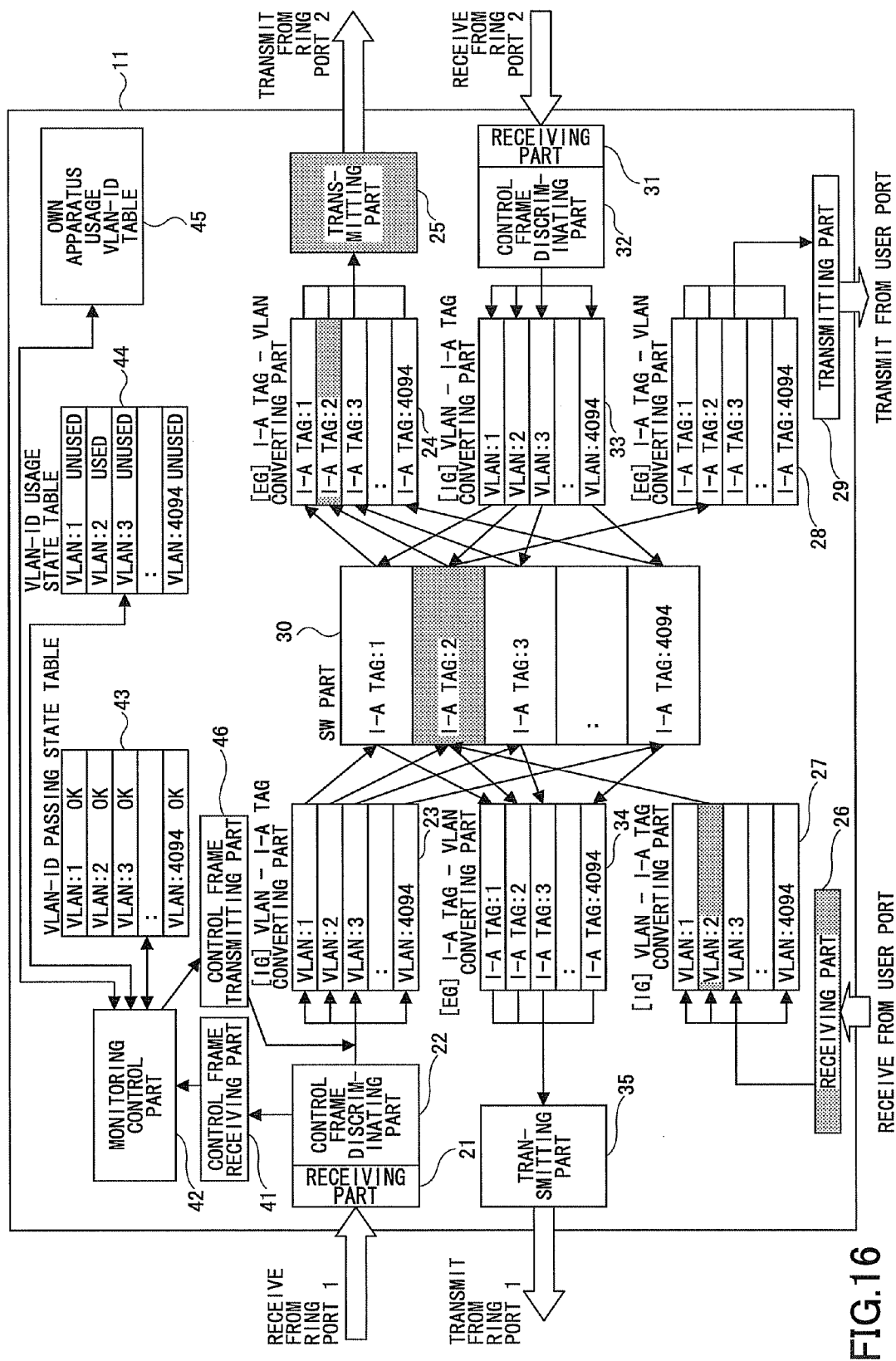
Figure 17:
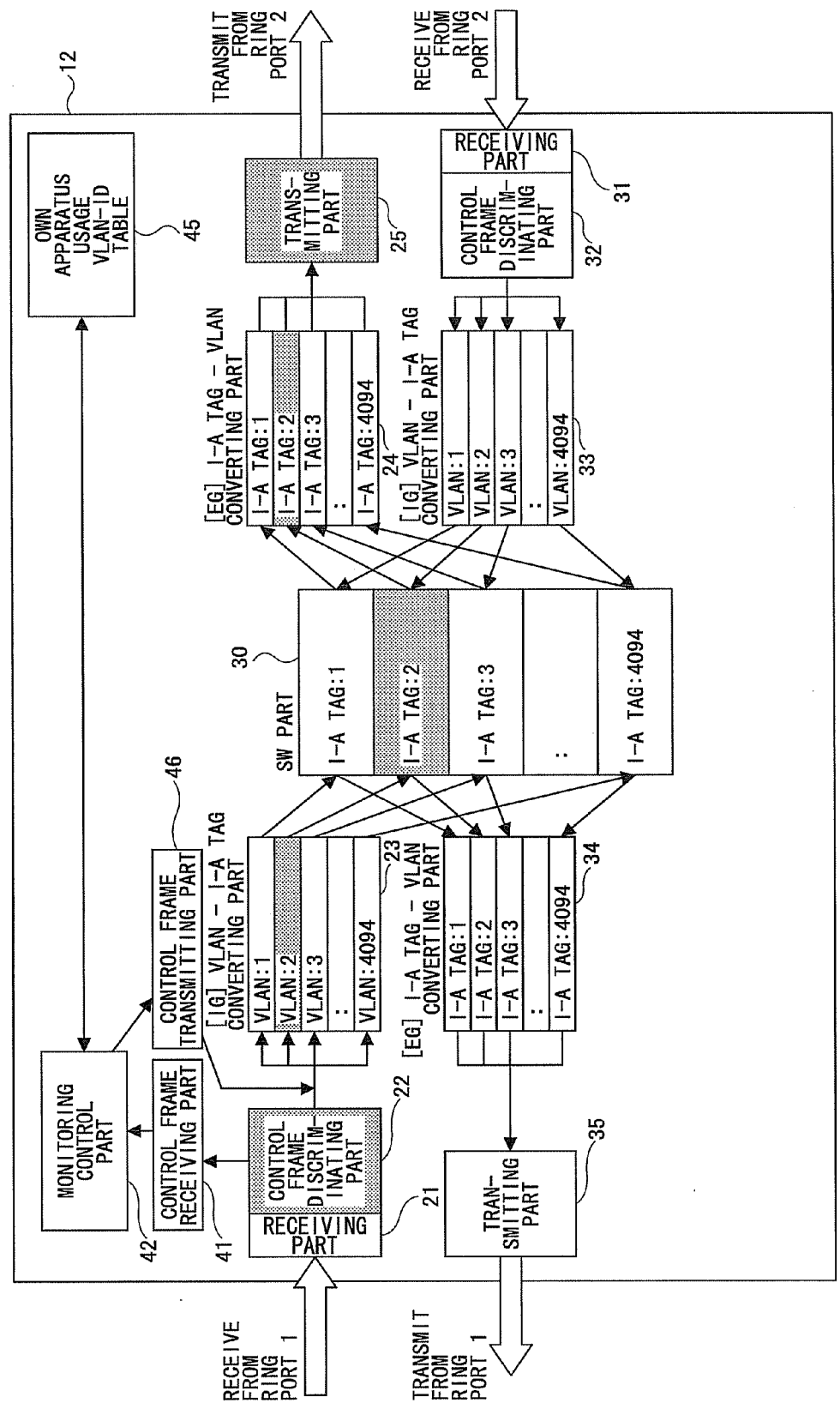
Figure 18:
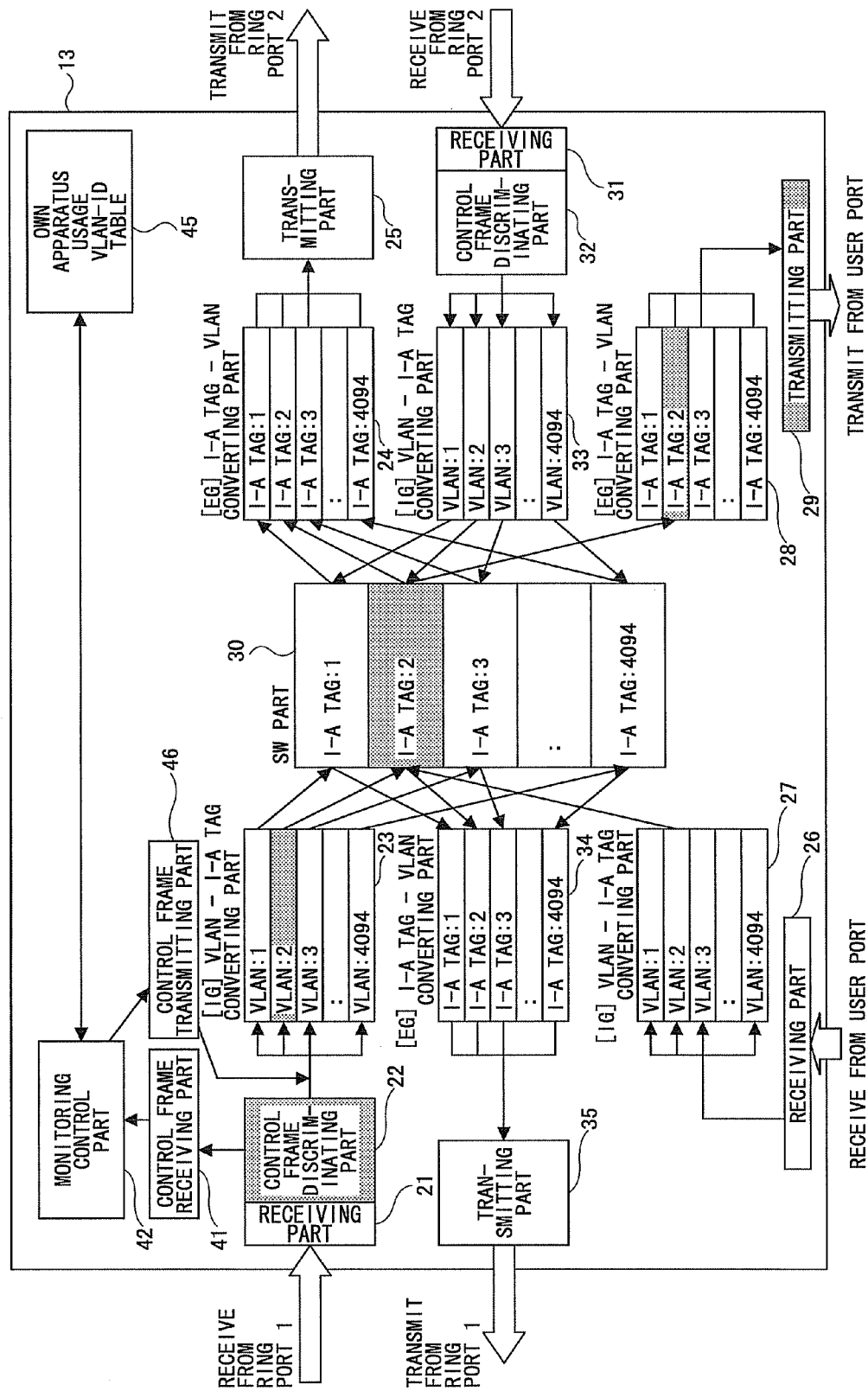

In the ring network depicted in FIG. 3A, VLAN-ID=2 is used to connect a user A connected to the user port of the bridge apparatus 11 and a user B connected to the user port of the bridge apparatus 13. FIGS. 16, 17 and 18 diagrammatically depict respective states in the bridge apparatuses 11, 12 and 13. It is noted that, in FIGS. 16, 17 and 18, "INSIDE-APPARATUS TAG" is simply referred to as "I-A TAG" in each occurrence. In FIGS. 16, 17 and 18, used parts in the VLAN—inside-apparatus tag converting parts 23, 27 and 33, the switch part 30 and the inside-apparatus tag—VLAN converting parts 24, 28 and 34, are indicated as being filled with halftone dots.

Figure 19:
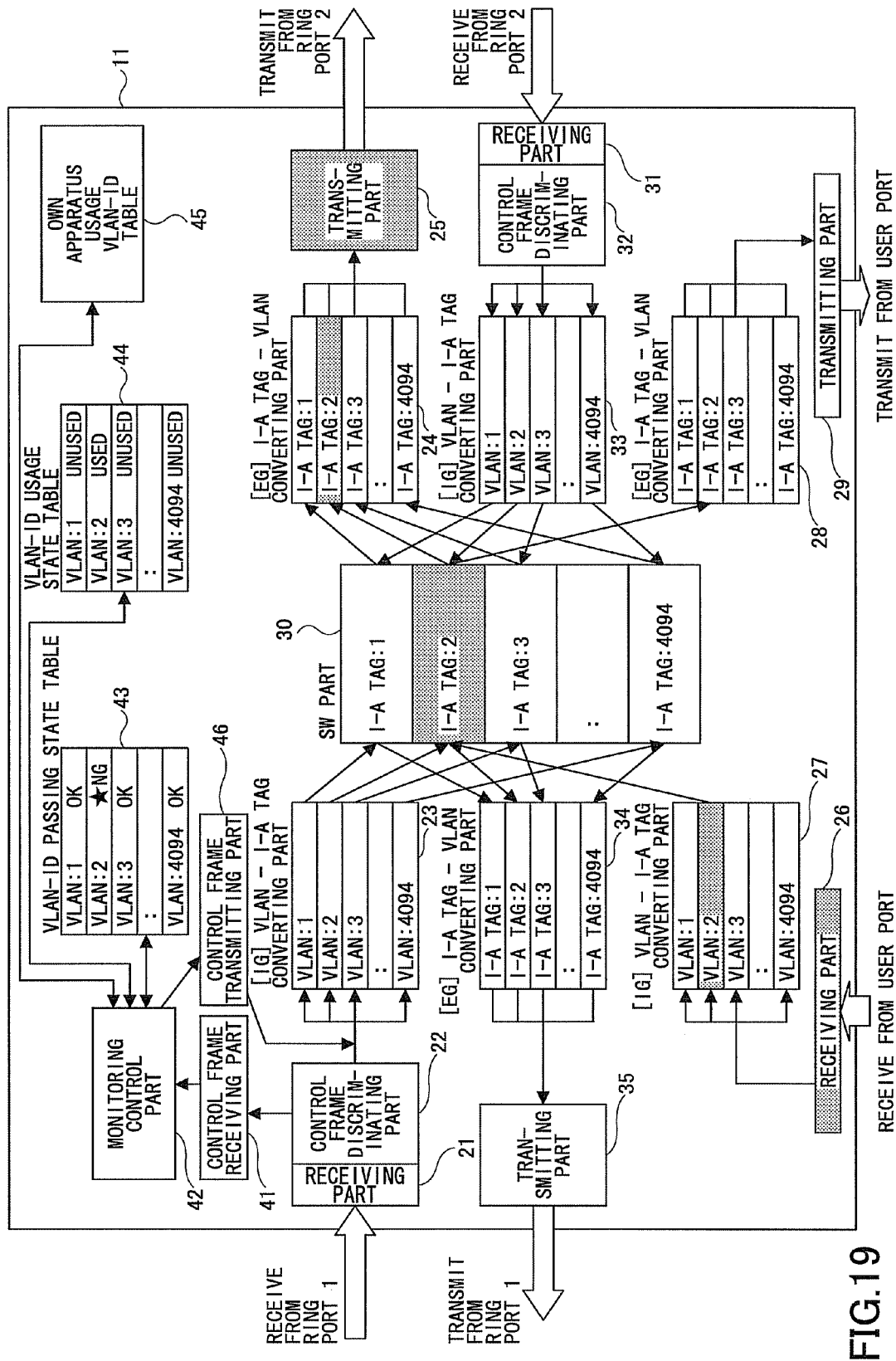
Figure 20:
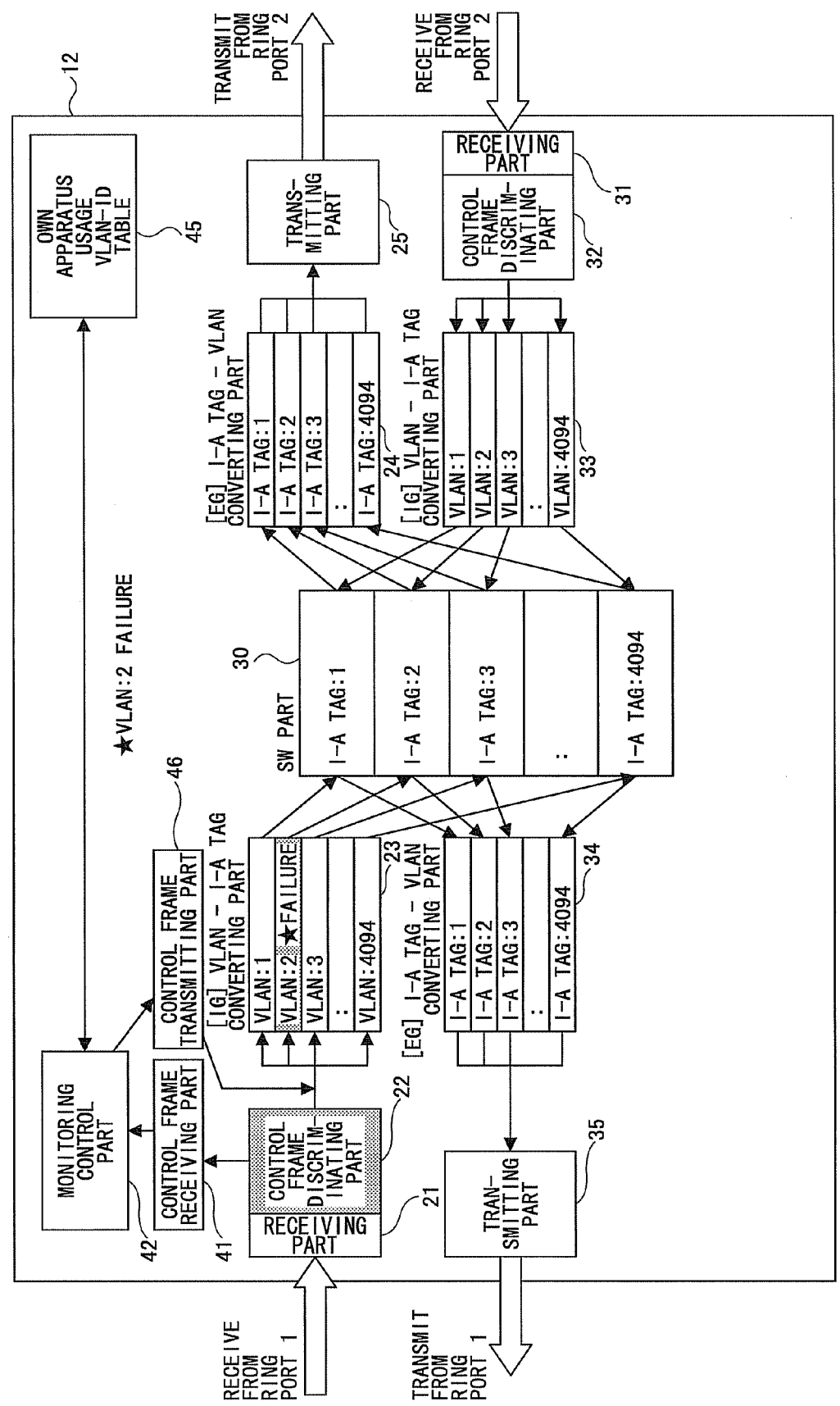
Figure 21:
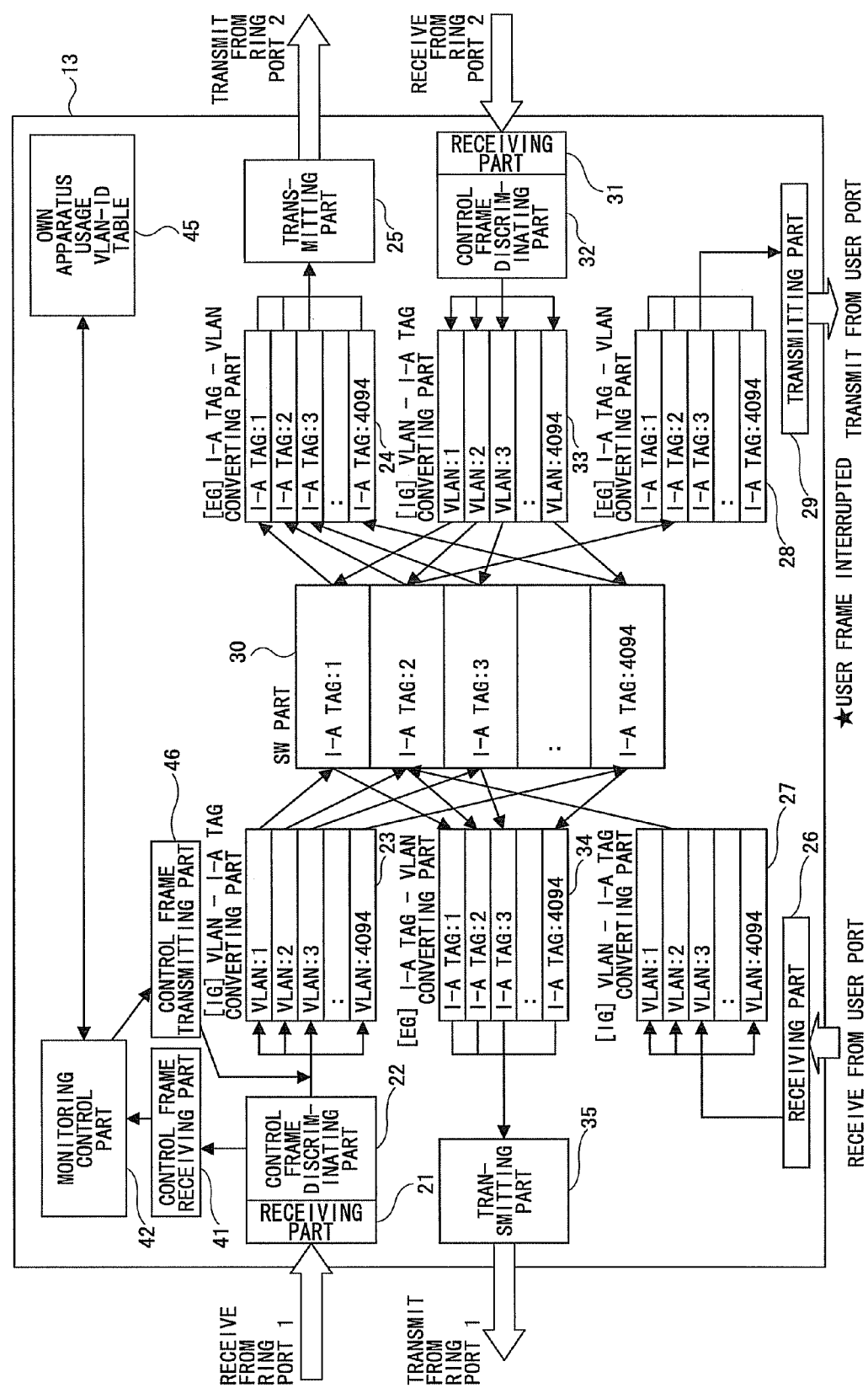

In this case, as depicted in FIG. 3B, the bridge apparatus 11 acting as the representative transmits a pass checking frame and a usage state checking frame to the side of the bridge apparatus 14 from the blocking port, and thus, circulates these frames in the ring network. Then, a case is assumed where it is determined that VLAN-ID=2 is in a "used" state and in a "non-passing" state, while, VLAN-ID=3 is in an "unused" state and in a "passing" state. FIGS. 19, 20 and 21 diagrammatically depict respective states of the bridge apparatuses 11, 12 and 13. It is noted that, in FIGS. 19, 20 and 21, "INSIDE-APPARATUS TAG" is simply referred to as "I-A TAG" in each occurrence. In FIGS. 19, 20 and 21, used parts in the VLAN—inside-apparatus tag converting parts 23, 27 and 33, the switch part 30 and the inside-apparatus tag— VLAN converting parts 24, 28 and 34, are indicated as being filled with halftone dots. In FIGS. 20 and 21, as can be seen, parts filled with halftone dots are reduced in comparison to FIGS. 17 and 18, because of a fault of VLAN-ID=2.

Figure 22:
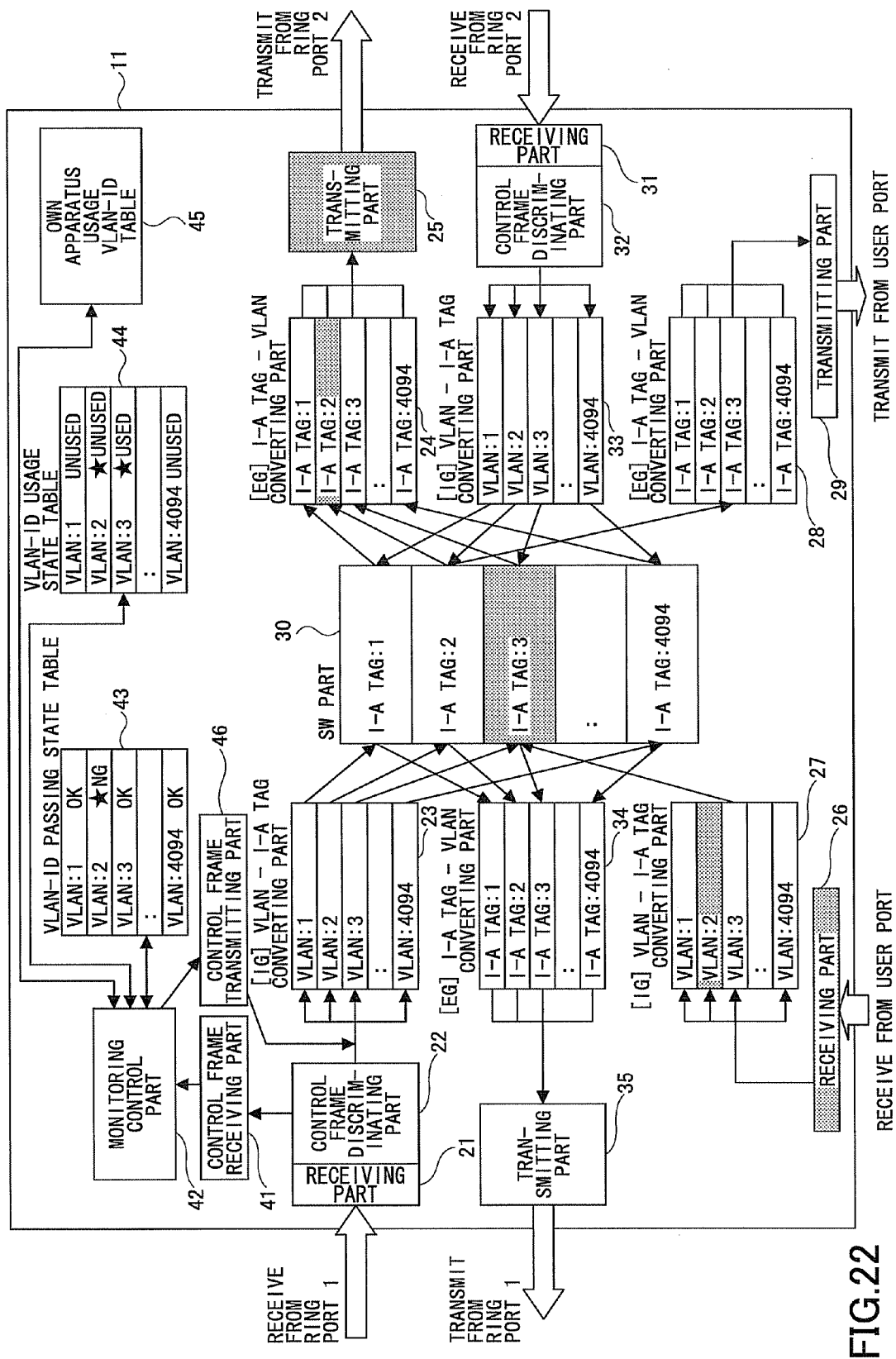
Figure 23:
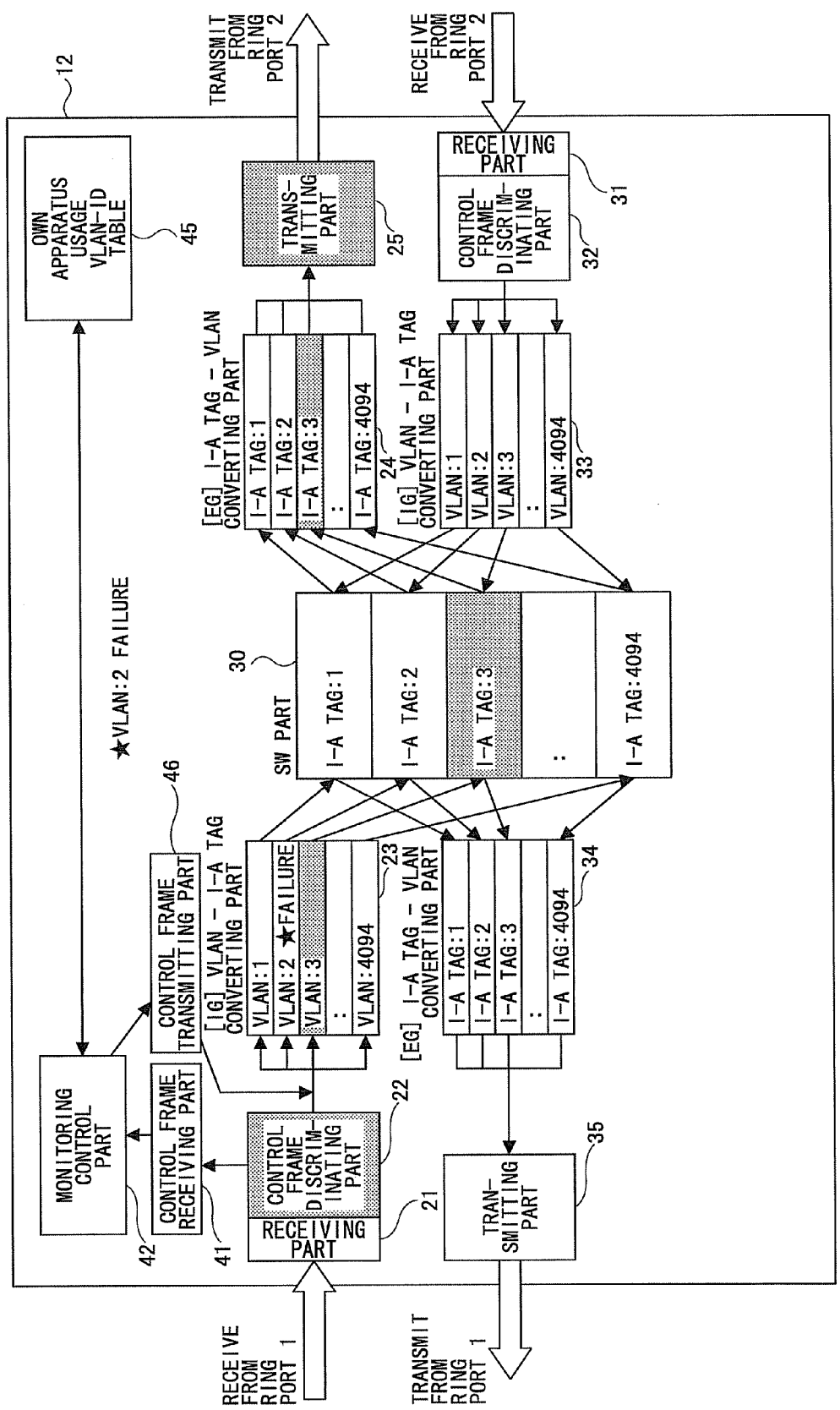

As a result, as depicted in FIG. 3C, the bridge apparatus 11 acting as the representative transmits a VLAN connection changing frame to the side of the bridge apparatus 14 from the blocking port, circulates the frame through the ring network, and thus, changes a connection setting between an inside-apparatus tag and VLAN-ID of the user port in each of the bridge apparatuses 11, 12 and 13. FIGS. 22, 23 and 24 diagrammatically depict respective states of the bridge apparatuses 11, 12 and 13, at this time. It is noted that, in FIGS. 22, 23 and 24, "INSIDE-APPARATUS TAG" is simply referred to as "I-A TAG" in each occurrence. In FIGS. 22, 23 and 24, used parts in the VLAN—inside-apparatus tag converting parts 23, 27 and 33, the switch part 30 and the inside-apparatus tag—VLAN converting parts 24, 28 and 34, are indicated as being filled with halftone dots. As can be seen from FIGS. 22, 23 and (changed states) in comparison to FIGS. 16, 17 and 18 (original states), VLAN-ID=2 is changed to VLAN-ID=3 in the ring network, and VLAN-ID=3 is associated with inside-apparatus tag=3 in the ring network.

More specifically, in the bridge apparatus 11 depicted in FIG. 22, a frame for VLAN-ID=2 is received via the user port from the outside of the ring network, and VLAN-ID=2 in the frame is converted into the inside-apparatus tag 3 by the VLAN—inside-apparatus tag converting part 27. Then, via the switch part 30, the frame reaches the inside-apparatus tag—VLAN converting part 24 that converts the inside-apparatus tag=3 in the frame into VLAN-ID=3, and the frame is then transmitted to the ring network via the ring port 2. Thus, in the inside of the ring network, the frame is transmitted as a frame for VLAN-ID=3, as depicted in FIG. 3C. Then, after passing through the bridge apparatus 12 depicted in FIG. 23, the frame reaches the bridge apparatus 13 depicted in FIG. 24 via the ring port 1, and the VLAN—inside-apparatus tag converting part 23 converts VLAN-ID=3 in the frame into the inside-apparatus tag 3. Then, via the switch part 30, the frame reaches the inside-apparatus tag—VLAN converting part 28 that converts the inside-apparatus tag 3 in the frame into VLAN-ID=2. Thus, the frame is transmitted to the outside of the ring network via the user port as a frame for VLAN-ID=2, as depicted in FIG. 3C.

Thus, according to the embodiment of the present invention, the VLAN-ID for which a fault occurs and the VLAN-ID used for transmitting a user frame in the ring network are identified. Then, when a fault occurs for the VLAN-ID used by a user such that signal transmission is interrupted, switching is automatically carried out in the ring network from the VLAN-ID for which the fault occurs to an unused VLAN-ID for which no fault occurs. Thereby, it is possible to rapidly recover from the interruption.

It is noted that, in the embodiment of the present invention, as depicted in FIG. 8, the trigger for transmitting a usage state checking frame is generated in step S16 after the bridge apparatus 11 receives the pass checking frames for all VLAN-IDs. However, the trigger for transmitting a usage state checking frame may be generated every predetermined time interval. In this case, instead of generating the trigger of completion of collection for the VLAN-ID passing state table 43 and the VLAN-ID usage state table 44 in step S39 of FIG. 11, a trigger for transmitting a VLAN connection changing frame is generated in step S16, by which the connection changing frame transmitting process depicted in FIG. 13 is started.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment(s) of the present inventions have been described in detail, it should be understood that various changes, substitutions, and alterations could be made hereto without departing from the sprit and scope of the invention.

What is claimed is:

1. A bridge apparatus among plural bridge apparatuses included in a ring network, comprising:
a pass checking frame creating and transmitting part configured to create plural pass checking frames that have plural virtual network identifiers that are different thereamong, respectively, to transmit the plural pass checking frames to the ring network and to cause the plural pass checking frames to go round the ring network;
a virtual network identifier passing state collecting part configured to receive, from the ring network, the plural pass checking frames to collect a passing state or a non-passing state of each of the plural virtual network identifiers;
a usage state checking frame creating and transmitting part configured to create a usage state checking frame, to transmit the usage state checking frame to the ring network and to cause the usage state checking frame to go round the ring network;
a virtual network identifier usage state collecting part configured to receive the usage state checking frame from the ring network to collect a used state or an unused state of the virtual network identifier of each of the plural bridge apparatuses included in the ring network;
a connection changing frame creating and transmitting part configured to create a connection changing frame which is used to change the virtual network identifier having the used state and the non-passing state into the virtual network identifier having the unused state and the passing state and transmit the virtual network identifier in the ring network, to transmit the connection changing frame, and to cause the connection changing frame to go round the ring network; and
a virtual network identifier changing part configured to change, when a first virtual network identifier included in the connection changing frame that is received from the ring network via a user port of the bridge apparatus is in a used state and in a non-passing state, the first virtual network identifier into a second virtual network identifier which is determined as being in an unused state and in a passing state by using the received usage state checking frame and the received pass checking frame.

2. The bridge apparatus as claimed in claim 1, wherein:
the virtual network identifier passing state collecting part has a network identifier passing state table that stores the passing state or the non-passing state of each of the plural virtual network identifiers, collected by the virtual network identifier passing state collecting part.

3. The bridge apparatus as claimed in claim 1, wherein:
the virtual network identifier usage state collecting part has a network identifier usage state table that stores the used state or the unused state of each of the plural virtual network identifiers, collected by the virtual network identifier usage state collecting part.

4. The bridge apparatus as claimed in claim 3, wherein:
the pass checking frame creating and transmitting part transmits the plural pass checking frames from a blocking port.

5. The bridge apparatus as claimed in claim 4, wherein:
the usage state checking frame creating and transmitting part transmits the usage state checking frame from the blocking port.

6. The bridge apparatus as claimed in claim 5, wherein:
the connection changing frame creating and transmitting part transmits the connection changing frame from the blocking port.

7. A virtual network switching method for a ring network, comprising:
a bridge apparatus among plural bridge apparatuses included in the ring network creating plural pass checking frames that have plural virtual network identifiers that are different thereamong, respectively, transmitting the plural pass checking frames to the ring network, causing the plural pass checking frames to go round the ring network, and collecting a passing state or a non-passing state of each of the plural virtual network identifiers;
the bridge apparatus creating a usage state checking frame, transmitting the usage state checking frame to the ring network, causing the usage state checking frame to go round the ring network, and collecting a used state or an unused state of the virtual network identifier of each of the plural bridge apparatuses included in the ring network;
the bridge apparatus creating a connection changing frame which is used to change the virtual network identifier having the used state and the non-passing state into the virtual network identifier having the unused state and the passing state and transmit the virtual network identifier in the ring network, transmitting the connection changing frame, and causing the connection changing frame to go round the ring network; and
each of the plural bridge apparatuses included in the ring network changing, when a first virtual network identifier included in the connection changing frame that is received from the ring network via a user port of the bridge apparatus is in a used state and in a non-passing state, the first virtual network identifier into a second virtual network identifier which is determined as being in an unused state and in a passing state by using the received usage state checking frame and the received pass checking frame.

8. The virtual network switching method as claimed in claim 7, wherein:
the bridge apparatus stores, in a network identifier passing state table, the passing state or the non-passing state of each of the plural virtual network identifiers, which has been collected.

9. The virtual network switching method as claimed in claim 7, wherein:
the bridge apparatus stores, in a network identifier usage state table, the used state or the unused state of each of the plural virtual network identifiers, which has been collected.

* * * * *